US012350529B2

(12) United States Patent
McLeod et al.

(10) Patent No.: US 12,350,529 B2
(45) Date of Patent: Jul. 8, 2025

(54) SAFETY HARNESS WITH SELF-LOCKING DORSAL BRACE

(71) Applicant: 3M INNOVATIVE PROPERTIES COMPANY, St. Paul, MN (US)

(72) Inventors: Christopher S. McLeod, Lake Elmo, MN (US); Nathan W. Safe, Red Wing, MN (US); David A. Schlangen, Red Wing, MN (US); Stephen D. Shaver, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 650 days.

(21) Appl. No.: 17/771,364

(22) PCT Filed: Nov. 17, 2020

(86) PCT No.: PCT/IB2020/060822
§ 371 (c)(1),
(2) Date: Apr. 22, 2022

(87) PCT Pub. No.: WO2021/099940
PCT Pub. Date: May 27, 2021

(65) Prior Publication Data

US 2022/0355134 A1 Nov. 10, 2022

Related U.S. Application Data

(60) Provisional application No. 62/938,706, filed on Nov. 21, 2019.

(51) Int. Cl.
*A62B 35/00* (2006.01)

(52) U.S. Cl.
CPC ...... *A62B 35/0037* (2013.01); *A62B 35/0018* (2013.01)

(58) Field of Classification Search
CPC ........... A62B 35/0037; A62B 35/0006; A62B 35/0018; A62B 35/0031
See application file for complete search history.

(56) References Cited

U.S. PATENT DOCUMENTS 6,179,188 B1 1/2001 Gleason
6,405,728 B1 6/2002 Van Hall et al.
(Continued)

FOREIGN PATENT DOCUMENTS

CN 207745433 U 8/2018
DE 10343072 1/2005
(Continued)

OTHER PUBLICATIONS

3M DBI Sala Fall Protection Full Line Catalog 2017, pp. 1-105.
(Continued)

*Primary Examiner* — Johnnie A. Shablack
(74) *Attorney, Agent, or Firm* — Kenneth B. Wood

(57) ABSTRACT

A fall-protection safety harness including left and right shoulder straps and a waist strap, and a dorsal plate mounted on the left and right shoulder straps at a dorsal crossing point. A dorsal brace for use with such a harness, the brace comprising a self-locking fastener at the upper end of the dorsal brace. The fastener is fastenable, and self-locking, to the dorsal plate, and a lower end of the dorsal brace is connectable to the waist strap. Methods of equipping a safety harness with the dorsal brace.

21 Claims, 17 Drawing Sheets

(56) References Cited

U.S. PATENT DOCUMENTS

| | | | | |
|---|---|---|---|---|
| 6,971,476 | B2 | 12/2005 | Wolner et al. | |
| 8,177,025 | B2 * | 5/2012 | Lang | A62B 35/0037 182/4 |
| 8,356,604 | B2 * | 1/2013 | Tweardy | A61F 5/055 602/17 |
| 8,701,674 | B2 | 4/2014 | Tweardy et al. | |
| 8,959,664 | B2 | 2/2015 | Johnson et al. | |
| 9,174,073 | B2 | 11/2015 | Casebolt et al. | |
| 9,273,717 | B2 * | 3/2016 | Schlangen | F16B 45/027 |
| 9,320,924 | B2 * | 4/2016 | Patel | F16B 45/06 |
| 9,427,608 | B2 * | 8/2016 | Fink | A62B 35/0075 |
| 9,649,515 | B2 * | 5/2017 | Theisen | A62B 35/0025 |
| 9,821,178 | B2 * | 11/2017 | Casebolt | A62B 35/0075 |
| 9,993,669 | B2 * | 6/2018 | Casebolt | A62B 35/0037 |
| 10,137,322 | B2 | 11/2018 | Perner | |
| 10,232,199 | B2 | 3/2019 | Perner | |
| 10,561,866 | B1 | 2/2020 | Hinnant | |
| 11,497,948 | B2 * | 11/2022 | Monahan | A62B 35/0031 |
| 11,660,476 | B2 * | 5/2023 | Monahan | A44B 11/2519 182/3 |
| 11,850,453 | B2 * | 12/2023 | Perner | A62B 35/0006 |
| 2005/0067221 | A1 | 3/2005 | Wolner et al. | |
| 2005/0082114 | A1 * | 4/2005 | Casebolt | A62B 35/0037 182/3 |
| 2006/0048723 | A1 * | 3/2006 | Rohlf | A62B 35/04 119/857 |
| 2006/0102423 | A1 | 5/2006 | Lang et al. | |
| 2008/0060873 | A1 * | 3/2008 | Lang | A62B 35/0018 182/18 |
| 2011/0017546 | A1 | 1/2011 | Nichols, Jr. | |
| 2013/0104374 | A1 * | 5/2013 | Schlangen | F16B 45/022 24/600.2 |
| 2014/0224580 | A1 * | 8/2014 | Casebolt | F16F 7/006 188/376 |
| 2014/0331459 | A1 | 11/2014 | Fink et al. | |
| 2016/0089554 | A1 | 3/2016 | Perner | |
| 2016/0361577 | A1 | 12/2016 | Perner et al. | |
| 2019/0001165 | A1 * | 1/2019 | Schurian | A44B 13/0029 |
| 2019/0313746 | A1 | 10/2019 | Hetrich | |
| 2019/0329077 | A1 | 10/2019 | Carrasca et al. | |
| 2022/0080233 | A1 * | 3/2022 | Safe | A62B 35/0018 |
| 2022/0355134 | A1 * | 11/2022 | McLeod | A62B 35/0018 |

FOREIGN PATENT DOCUMENTS

| | | | | |
|---|---|---|---|---|
| JP | 2020110275 | | 7/2020 | |
| KR | 200489690 | Y1 | 7/2019 | |
| WO | WO-2008089128 | A2 * | 7/2008 | A45F 3/14 |
| WO | WO-2013155065 | A1 * | 10/2013 | A45F 3/00 |
| WO | 2016048711 | | 3/2016 | |
| WO | 2019012468 | A1 | 1/2019 | |
| WO | 2020148655 | | 7/2020 | |

OTHER PUBLICATIONS

Exofit Strata Brochure, 8 pages.
Exofit Strata Instructions, 2015, 15 pages.
International Search Report for PCT International Application No. PCT/IB2020/060822, mailed on Mar. 12, 2021, 3 pages.
Instruction Manual, 2017, 24 pages.

* cited by examiner

SAFETY HARNESS WITH SELF-LOCKING DORSAL BRACE

Cross Reference to Related Applications

This application is a national stage filing under 35 U.S.C. 371 of PCT/IB2020/060822, filed Nov. 17, 2020, which claims the benefit of U.S. Provisional Patent Application No. 62/938,706, filed Nov. 21, 2019, the disclosure of which is incorporated by reference in its/their entirety herein.

BACKGROUND

Safety harnesses are often used to reduce the likelihood of a user experiencing a fall, and/or to safely arrest the user in the event of a fall. Such harnesses are often used in combination with one or more of a self-retracting lifeline (e.g., a personal self-retracting lifeline), an energy-absorbing lanyard, and other fall-protection equipment.

SUMMARY

In broad summary, herein is disclosed a fall-protection safety harness including left and right shoulder straps and a waist strap, and a dorsal plate mounted on the left and right shoulder straps at a dorsal crossing point. Also disclosed is a dorsal brace for use with such a harness, the brace comprising a self-locking fastener at the upper end of the dorsal brace. The fastener is fastenable, and self-locking, to the dorsal plate, and a lower end of the dorsal brace is connectable to the waist strap. Also disclosed are methods of equipping a safety harness with such a dorsal brace. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Figure 1:
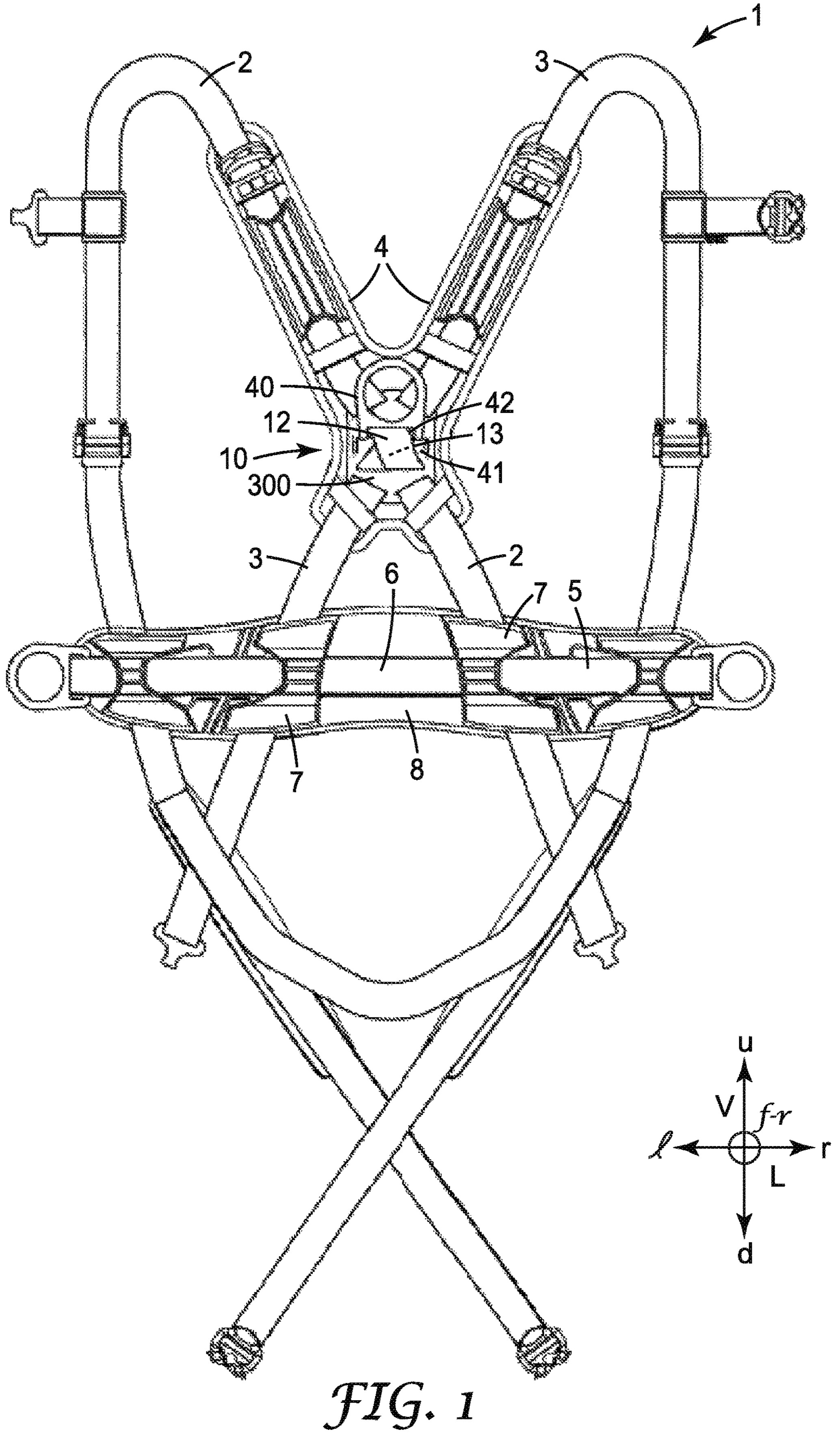
FIG. 1 is a rear view in generic representation of an exemplary fall-protection safety harness with which a dorsal brace as disclosed herein may be used.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "first" and "second" may be used in this disclosure, it should be understood that those terms are used in their relative sense only unless otherwise noted.

The following terminology is defined with respect to a fall-protection safety harness as worn by a user standing upright, when viewed from behind the user:

Terms such as vertical, upward and downward, above, and below, and so on, correspond to directions that are at least generally parallel to the sagittal plane and the coronal plane of a user wearing the harness. The vertical axis (V), and upward (u) and downward (d) directions along the vertical axis, are denoted in various Figures. The vertical axis will often correspond to the "vertical" direction with respect to the Earth's gravity, e.g., when the harness is worn by a user who is standing upright. The term forward denotes a direction that is generally perpendicular to the vertical axis and is toward the body of a user of the harness. The term rearward denotes a generally opposing direction, away from the body of the user of the harness. The forward-rearward directions (f) and (r) are denoted in various Figures, and will typically be generally parallel to the transverse plane of the user when standing upright. By way of a specific example, the forward direction is into-plane, and the rearward direction is out-of-plane, in FIGS. 1 and 2. (In the Figures, "r" for rearward is italicized to distinguish from "r" for right.) The term lateral denotes a direction that is generally perpendicular to the vertical direction and runs in a direction generally parallel to the coronal plane of the user; i.e., a side-to-side, left-right direction. The lateral axis (L), and left (l) and right (r) directions along the lateral axis, are denoted in various Figures. For ease of description, the above terminology will be applied to items, e.g., a dorsal brace, even if the item has not yet been installed into a fall-protection harness.

The term "dorsal" has its usual meaning with regard to human anatomy, indicating the region in proximity to the back of a person, extending generally from the shoulders down to the lumber region.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties, unless otherwise specified). For angular orientations, the term "generally" means within clockwise or counterclockwise 40 degrees, unless otherwise specified. The term "substantially", unless otherwise specifically defined, means to a high degree of approximation (e.g., within +/−10% for quantifiable properties). For angular orientations, the term "substantially" means within clockwise or counterclockwise 20 degrees. The term "essentially" means to a quite high degree of approximation (e.g., within plus or minus 2% for quantifiable properties; within plus or minus 10 degrees for angular orientations); it will be understood that the phrase "at least essentially" subsumes the specific case of an "exact" match. However, even an "exact" match, or any other characterization using terms such as, e.g., same, equal, identical, uniform, constant, and the like, will be understood to be within the usual tolerances or measuring error applicable to the particular circumstance rather than requiring absolute precision or a perfect match. The term "configured to" and like terms is at least as restrictive as the term "adapted to", and requires actual design intention to perform the specified function rather than mere physical capability of performing such a function. All references herein to numerical parameters (dimensions, ratios, and so on) are understood to be calculable (unless otherwise noted) by the use of average values derived from a number of measurements of the parameter.

DETAILED DESCRIPTION

Fall-protection safety harnesses, some-times referred to as full-body safety harnesses, are widely used in circumstances in which workers are at elevated height or are otherwise at risk of falling. A fall-protection safety harness is configured to serve in combination with a fall-protection device or apparatus such as, e.g., a self-retracting lifeline or horizontal lifeline, a lanyard or the like, to provide fall protection. Thus in ordinary use, at least one such fall-protection device is typically connected to the safety harness, e.g., to a D-ring (or other suitable connection point) borne by the harness. Fall-protection safety harnesses will be distinguished from, for example, general-use items such as backpacks and the like.

Figure 2:
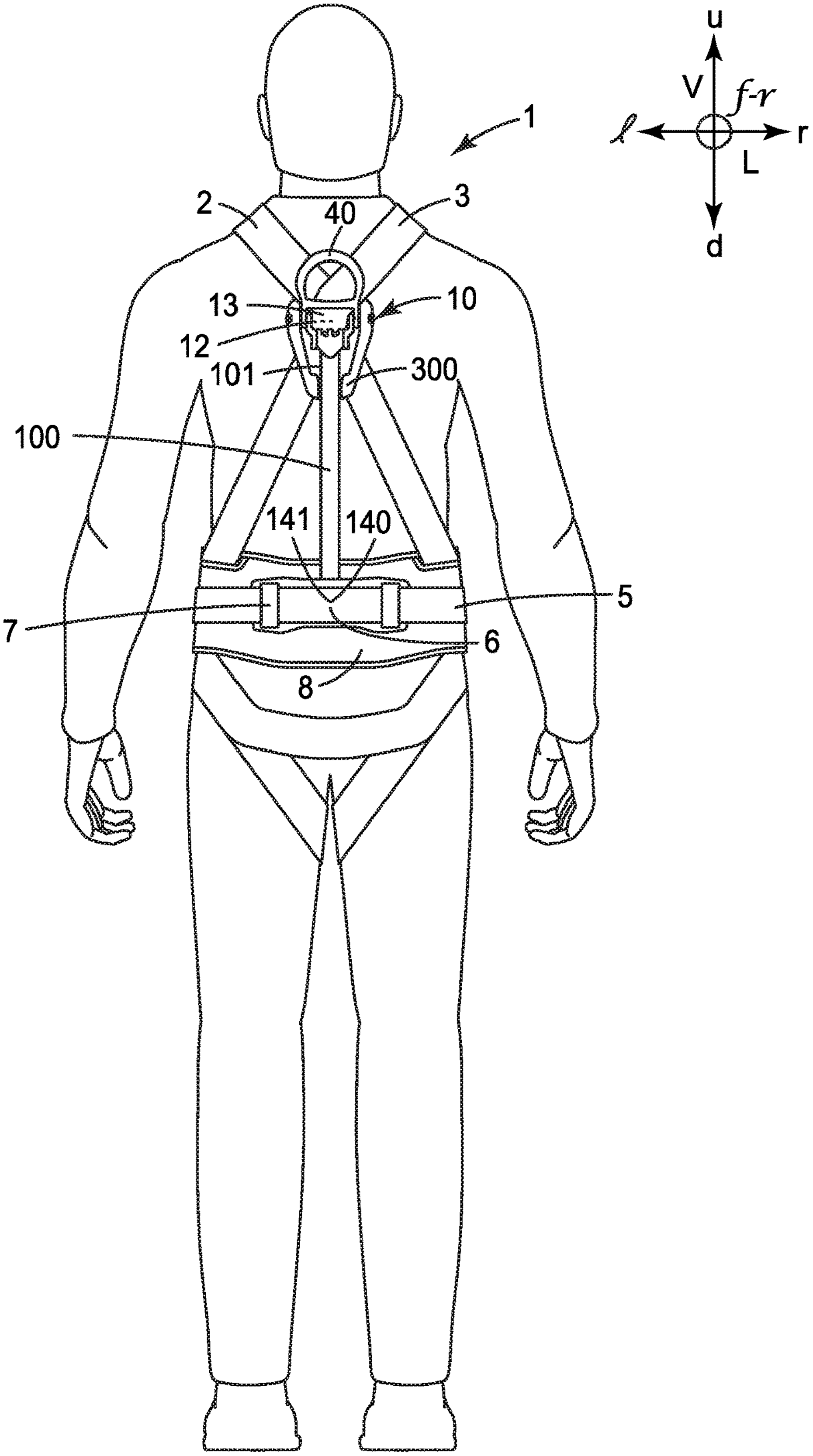
FIG. 2 is a rear view in generic representation of an exemplary fall-protection safety harness equipped with an exemplary dorsal brace, as worn by a user.

As illustrated in generic representation in FIG. 1, a full-body fall-protection safety harness 1 will comprise first and second shoulder straps 2 and 3 that extend over the top of the shoulders as shown in FIG. 2. A harness 1 will also comprise a waist strap 5 that encircles the waist/hip area of the user. Such straps are often comprised of flat webbing, made of, e.g., woven synthetic fabric such as, e.g., polyamide, polyaramid (such as, e.g., Kevlar), ultra-high molecular weight polyethylene (such as, e.g., Dyneema) and the like. Such straps are typically flexible (e.g., so that they can conform to the surface of a wearer's body, can be passed through one or more of buckles, guides, loops and the like) but typically are not significantly extensible. As will be well understood, such straps (and other straps such as, e.g., leg or thigh straps as may be present) are interconnected with each other and are often fitted with various pads (e.g., shoulder pads 4 and waist/hip pad 8) to enhance the comfort of the harness, as well as various buckles, latches, connectors, loops, guides, additional pads such as, e.g., chest pads and/or leg pads, and so on. Such components and exemplary arrangements of such components are described in, for example, U.S. Pat. Nos. 8,959,664, 9,174,073, and 10137322, all of which are incorporated by reference in their entirety herein. It will be understood that the particular arrangements of FIGS. 1 and 2 are intended as exemplary representations; in actuality a safety harness may vary from the arrangements shown in these Figures.

In many safety harness designs, first and second shoulder straps 2 and 3 meet, overlap and cross each other at a dorsal crossing point 10 as indicated in FIGS. 1 and 2. Such a dorsal crossing point will be located generally toward the middle of the users back, e.g., between portions of the shoulder blades. The term point is used for convenience of description and does not require that the straps intersect at a single "point" in the mathematical sense. Rather, the first and second shoulder straps 2 and 3 will respectively comprise overlapping sections 12 and 13 that typically will be in at least partially overlapping relation for a macroscopic distance (e.g., for several cm) along their lengths. In some instances the straps may be guided so that the overlapping sections of the straps are at least generally parallel over a short distance, e.g., as they pass through various slots, guides, or the like. The dorsal area in which the shoulder straps are at least partially overlapped with each other (when viewed along the forward-rearward direction) is referred to herein as the dorsal crossing point.

Fall-protection safety harnesses often include various plates that may be relatively rigid (e.g., made of molded plastic and/or metal) e.g., in comparison to other, relatively flexible harness components such as straps, pads and cushions. For example, many harnesses include a dorsal plate 300 as shown in various exemplary configurations in FIGS. 1 and 2. Such a dorsal plate will be located at the dorsal crossing point and typically helps to guide the shoulder straps and/or to support a dorsal pad or cushion. That is, first and second straps 2 and 3 will typically meet and cross over at a location occupied by a dorsal plate 300, with the dorsal plate comprising various guides, slots and the like, to aid in the placement and guiding of the straps, as shown in exemplary, generic representation in FIGS. 1 and 2. In many embodiments a dorsal plate may support a dorsal D-ring 40 (or any appropriate entity that allows a desired item or apparatus to be connected to the harness).

As illustrated in generic representation in FIG. 2, herein is disclosed the use of a brace 100 with an upper end 101 that is fastened to dorsal plate 300 and with a lower end 140 that is connected to a dorsal portion 6 of waist strap 5. The mechanisms by which upper end 101 is fastened to dorsal plate 300, and by which lower end 140 is connected to waist strap 5, will be discussed in detail later herein.

Dorsal brace 100 serves as a force-transfer member, meaning that it acts to transfer at least a portion of a load that would otherwise be borne (directly or indirectly) by shoulder straps 2 and 3, to waist strap 5. By a dorsal force-transfer member is meant that such a load is transferred along the back of the wearer of the harness rather than along the front or lateral sides of the wearer. Such a load may result from the weight of various items (e.g., one or more of hooks, self-retracting lifelines, D-rings, carabiners, fasteners, buckles, latches, tools, equipment, and so on), that are attached to or otherwise connected directly or indirectly to shoulder straps 2 and 3 and/or a dorsal plate 300. The load may often result from the aggregate effect of components of the harness itself, e.g., along with items attached to the harness. Whatever the source of the load, dorsal brace 100 is configured so that brace 100 is loaded in compression so as to transfer a portion of this load from the shoulders of the user to the waist/hips of the user. That is, the direction of the force transfer is downward, e.g., at least generally along the vertical axis of the harness. Thus by definition, dorsal brace 100 is distinguished from any member or component that is configured to transfer a load in the opposite, upward direction (from the waist toward the shoulders). (Members configured to transfer a load upward, from the waist toward the shoulders, include for example the spinal support plate disclosed in U.S. Pat. No. 6,405,728.)

A dorsal brace 100 as disclosed herein can distribute loads more evenly and can enhance the comfort of a fall-protection safety harness, particularly if the harness is worn for an extended period of time. Moreover, as discussed in detail later herein, dorsal brace 100 is manually connectable to (and, in some embodiments, may be removable from) the harness rather than being permanently factory-installed. Thus if desired, brace 100 can be manually installed (i.e., by hand, without any special tools or fixtures being required) as needed, e.g., by a user in the field. (In this particular context, a "user" may be a person who will actually wear the harness, or may be some other person designated to perform the installation.) Such arrangements are distinguished from those that require a dorsal brace to be factory-installed when a harness is manufactured and from those that require a harness to be returned to the factory or service center in order to retrofit the harness with a dorsal brace.

Further details and characteristics of dorsal brace 100 are described with reference to FIG. 3, which depicts an exemplary dorsal brace 100 fastened to a dorsal plate 300. For ease of presentation of the features and functionalities of these items, in these and many other Figures, all other components of harness 1 (including shoulder straps 2 and 3) are omitted. However, ordinary artisans will readily appreciate how, for example, how a dorsal plate 300 can be mounted on shoulder straps 2 and 3 and how straps 2 and 3 can be threaded through various guides, slots, and so on, of dorsal plate 300.

Figure 3:
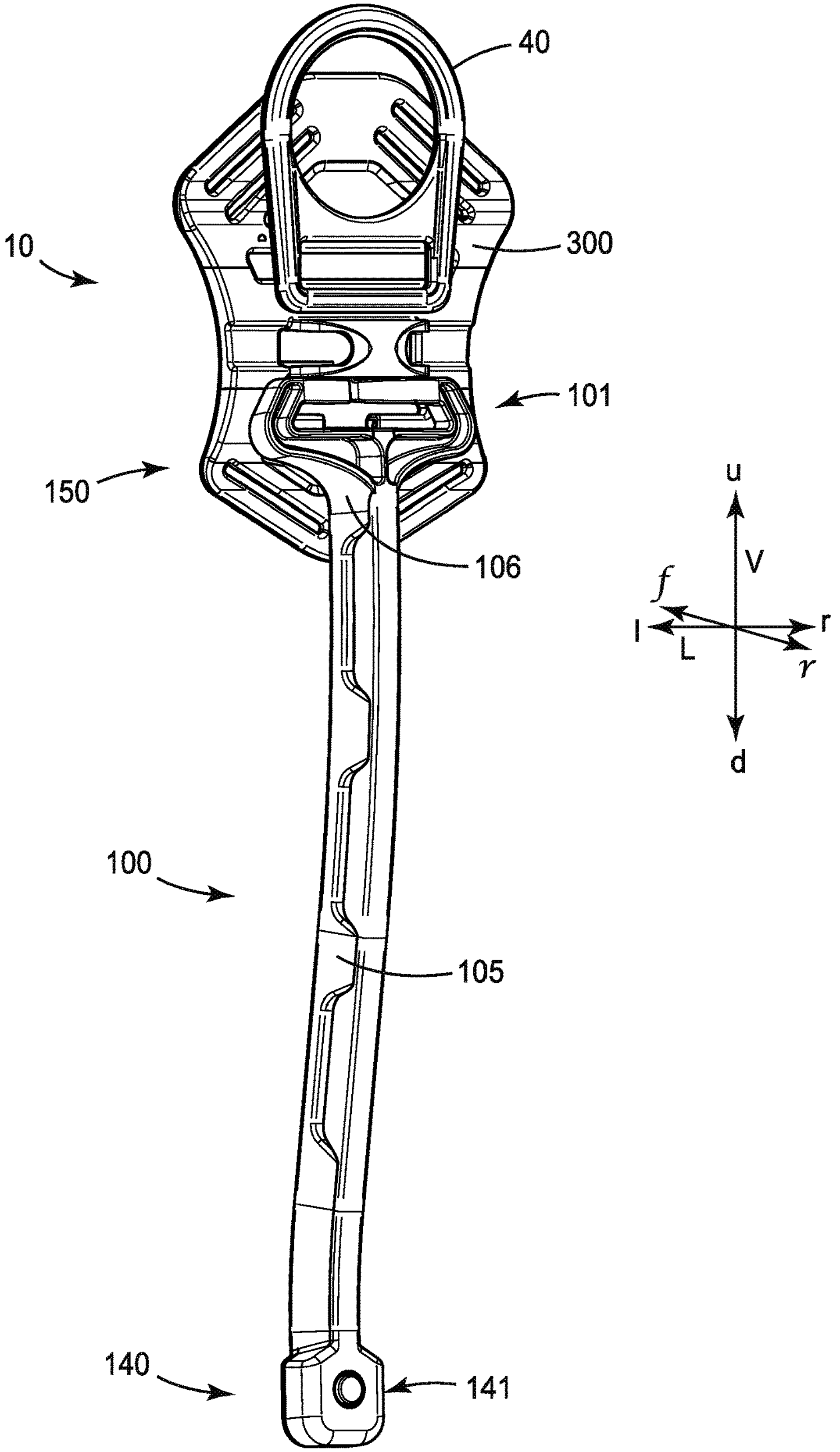
FIG. 3 is a side-rear view of an exemplary dorsal brace fastened to an exemplary dorsal plate.

A dorsal brace 100 will include at least one elongate member 105 as evident in FIG. 3. A fastener 150, that is configured to allow brace 100 to be fastened to dorsal plate 300, is provided at upper end 106 of elongate member 105; typically, fastener 150 provides the upper end 101 of brace 100. The lower end 140 of brace 100 is connected to a waist strap 5. In ordinary use of harness 1 and dorsal brace 100, elongate member 105 will typically be at least generally vertically oriented, excepting then the wearer is, e.g., leaning, bending, or the like.

In order to serve the above-discussed force-transfer functions, a dorsal brace 100 will be rigid. By "rigid" is meant that in ordinary use of harness 1 (e.g., as a user of the harness stands, walks, crouches, leans, etc.), brace 100 will remain in its original shape rather than deforming (e.g., bending) In various embodiments, brace 100 may be made of (or include an elongate beam of) a material with a flexural modulus of at least 1.0, 2.0, 3.0, 4.0, 5.0, 10, 15 or 20 GPa; in further embodiments, the flexural modulus may be at most 30, 25, 18, 13, or 8 GPa. In some embodiments, brace 100 may comprise a resilient coating, padding, cushion, or the like that is applied to at least a portion of the surface of member 105. However, brace 100 must at least include an elongate beam of appropriate stiffness to provide the desired rigidity. Furthermore, member 105 of brace 100 must not be hinged or articulated in any such way that would allow it to deform or collapse rather than maintaining its original shape under a load.

In some exemplary embodiments a member 105 of a brace 100 may take the form of, or include, an elongate beam of metal such as steel or aluminum. In such embodiments the beam may be, e.g., coated or overmolded in various locations as desired with a soft, e.g., rubbery, material to serve as a padding or cushion. In some embodiments at least elongate member 105 of brace 100 may be formed of a rigid organic polymeric material (e.g., an injection-moldable resin) with a flexural modulus of at least 1.0, 2.0, 3.0, 4.0, 5.0, 10, 15 or 20 GPa. (By a "rigid" material is meant a material that exhibits a flexural modulus of at least 1.0 GPa). In some embodiments the organic polymeric material may include one or more fillers, e.g., glass particles, glass fibers, carbon fibers, and so on, in order to impart the material with the desired flexural modulus.

In some embodiments, a fastener 150 at upper end 101 of brace 100 may be comprised of the same organic polymeric material as elongate member 105. For example, in some embodiments member 105 and fastener 150 may be molded in a single operation so that these items are integral portions of a single molded dorsal brace 100, with fastener 150 extending integrally from elongate member 105. This will be contrasted to exemplary embodiments in which, for example, a separately-made fastener 150 (which may be made of a material that is different from that of member 105) is attached to an upper end of member 105.

Thus in some embodiments an elongate member 105 of a dorsal brace 100; and, an integral fastener 150 at an upper end of brace 100, may be portions of a single, integral body that consists essentially of molded organic polymeric material and that exhibits a flexural modulus of at least 1.0, 2.0, 3.0, 4.0, 5.0, 10, 15 or 20 GPa. In further embodiments such a material may exhibit a flexural modulus of at most 30, 25, 18, 13, or 8.0 GPa. In this context, the terminology "consists essentially of" specifically allows the presence of a macroscopic metal component in the form of a connector at the lower end of brace 100 (e.g., a metal post or stud 141 as shown in FIG. 3). In such an embodiment, no other macroscopic metal component (in particular, an elongate metal strut or beam) is permitted to be present in member 105 and/or fastener 150. However, such arrangements do not preclude the presence of, e.g., inorganic fillers that are added in powder or fiber form to enhance the mechanical properties of the molded organic polymeric materials (e.g., in order to achieve one of the above-recited values of flexural modulus). Such fillers might include e.g., metals or metal oxides, glass powder, glass fibers, carbon fibers and so on. In particular embodiments, member 105, fastener 150, or both, may be molded of polyamide resin (e.g., nylon 6, nylon 66, and so on) that is loaded with glass-fiber fillers.

The lower end 140 of dorsal brace 100 (e.g., the lower end of elongate member 105) will be connected to a waist strap 5 of harness 1. In some embodiments, the lower end 140 of brace 100 may be connected to a waist plate 7 that is provided, e.g., on at least a dorsal portion 6 of waist strap 5 as shown in exemplary embodiment in FIG. 2. The presence of such a waist plate 7 may enhance the degree to which the force transmitted downward by brace 100 can be distributed along waist strap 5. Such a waist plate 7 may be, e.g., mounted on waist strap 5 (e.g., waist strap 5 may pass through or along guides or slots provided in waist plate 7) permanently or removably, as will be readily understood. It will thus be clear that the concept of the lower end of a brace being connected to a waist strap specifically includes circumstances in which the lower end of the member is connected to a waist plate that is itself mounted on the waist strap. In other words, the connecting of the lower end of the brace to the waist strap may be, e.g., direct or indirect.

The lower end 140 of brace 100 can be connected to a waist strap 5 manually, by a user in the field, without the use of special tools or fixtures. In some embodiments, any such connection can be disconnected, e.g., if it is desired to remove brace 100 from harness 1. In some embodiments, lower end 140 of brace 100 may be pivotally connected to a waist strap 5 by providing a pivotal connection between the lower end of the brace and a waist plate that is (non-pivotally) mounted on the waist strap. This can allow the upper portion of brace 100 to pivotally move (e.g., along a side-to-side, lateral direction) through a desired angle. This can enhance the comfort of the harness, e.g., when the wearer is leaning to one side or the other, while still advantageously preserving the force-transmitting ability of the brace. In some embodiments the connection between the lower end 140 of brace 100 and a waist plate 7 may be a multi-axis connection (e.g., a ball-and socket connection) that allows not only some side-to-side pivotal movement of the member, but that may also allow at least a limited amount of forward-rearward pivotal movement of the member along the sagittal plane. This may further enhance the comfort of the harness, e.g., when the wearer is crouching, stooping or sitting.

In summary, the lower end 140 of brace 100 can be connected, e.g., pivotally connected, to waist plate 7 via any suitable connection. For example, the lower end 140 of brace 100 may comprise a detent feature, e.g., a stud or post, or a cavity or aperture, that can engage with a complementary feature of waist plate 7 to removably connect lower end 140 to waist plate 7. In the exemplary embodiment of FIG. 3, connection 141 is in the form of a metal post. It will be appreciated that there are many ways in which such a connection, e.g., a pivotal connection, may be achieved. Such arrangements, and in general the shape, size, and configuration of waist plate 7 and how it interacts with a waist strap, can be varied as desired. It is thus emphasized that the particular arrangements shown in FIGS. 1 and 2 are exemplary. Other arrangements and ways in which a lower end of a dorsal brace can be connected to a waist strap are presented in U.S. Provisional Patent Application No. 62/793,163, which is incorporated by reference herein in its entirety.

If desired, a dorsal brace 100 may be vertically adjustable. In some embodiments, this may be achieved by allowing member 105 to have an adjustable elongate length, e.g., by making it from first and second telescoping sections that comprise an actuator (e.g., a spring-biased push-button) that allow the sections to be moved relative to each other and then locked into a desired position. In some embodiments (in which the length of the member may or may not be adjustable), a waist plate 7 may be provided with several vertically spaced connecting points to which the lower end of member 105 can be connected.

In many embodiments a dorsal brace 100 may comprise an elongate member 105 that, when viewed along the forward-rearward direction, is relatively straight and is oriented at least generally parallel to the sagittal plane of the wearer of the harness (i.e., that extends generally vertically), along a majority, or all, of the elongate length of the member. In some particular embodiments such a member may be at least generally aligned with the sagittal plane of user, as in the exemplary design of FIG. 2. In many such embodiments such a member 105 may be connected to a waist plate 7 that is centered on the sagittal plane of the wearer of the harness, again as in the exemplary design of FIG. 2.

In some embodiments, member 105 may exhibit local deviations from such a linear geometry (in addition to such deviations that may be present in the form of features of fastener 150 at the upper end of the member. For example, in some embodiments the lower portion of member 105 may be bifurcated (split), e.g., into a generally inverted-"Y" configuration as it approaches the waist belt. Such arrangements may be used, for example, with a member that connects to a waist plate that extends a large lateral distance along the dorsal/lumber region, or that connects to first and second waist plates that are laterally spaced so as to bracket the sagittal plane (waist plates 7 of this general type are visible in the exemplary harness of FIG. 1). Such arrangements are encompassed within the disclosures herein as long as member 105, and brace 100 as a whole, functions to transmit a load at least generally along a vertical direction toward at least the dorsal portion of a waist strap as described herein. Such arrangements are distinguished from those in which a member or other item is configured to transfer a load in a direction with a large lateral component, e.g., to only the sides of the hips of a user.

It is noted that even if such a member 105 is generally, substantially, or essentially straight when viewed along the forward-rearward direction, in many embodiments such a member may be curved when viewed along the lateral direction. For example, a force-transfer member may be bowed outward (rearward) along a portion of its length, to generally follow the curvature of the wearer's back and/or to minimize contact of the member with the wearer's back.

Self-Locking of Fastener to Dorsal Plate

Figure 4:
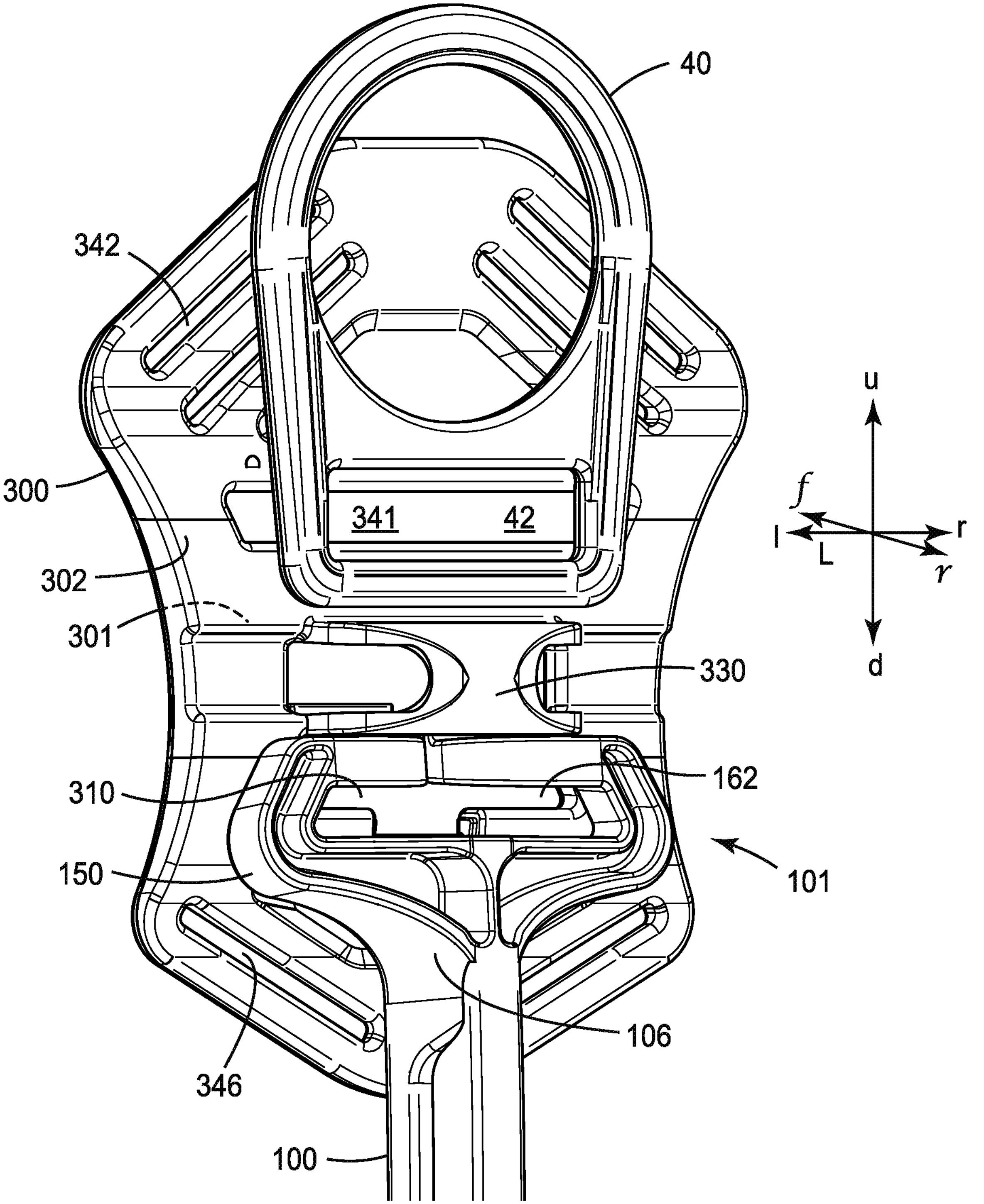
FIG. 4 is a magnified view of an upper portion of an exemplary dorsal brace, and an exemplary dorsal plate to which the dorsal brace is fastened.
Figure 5:
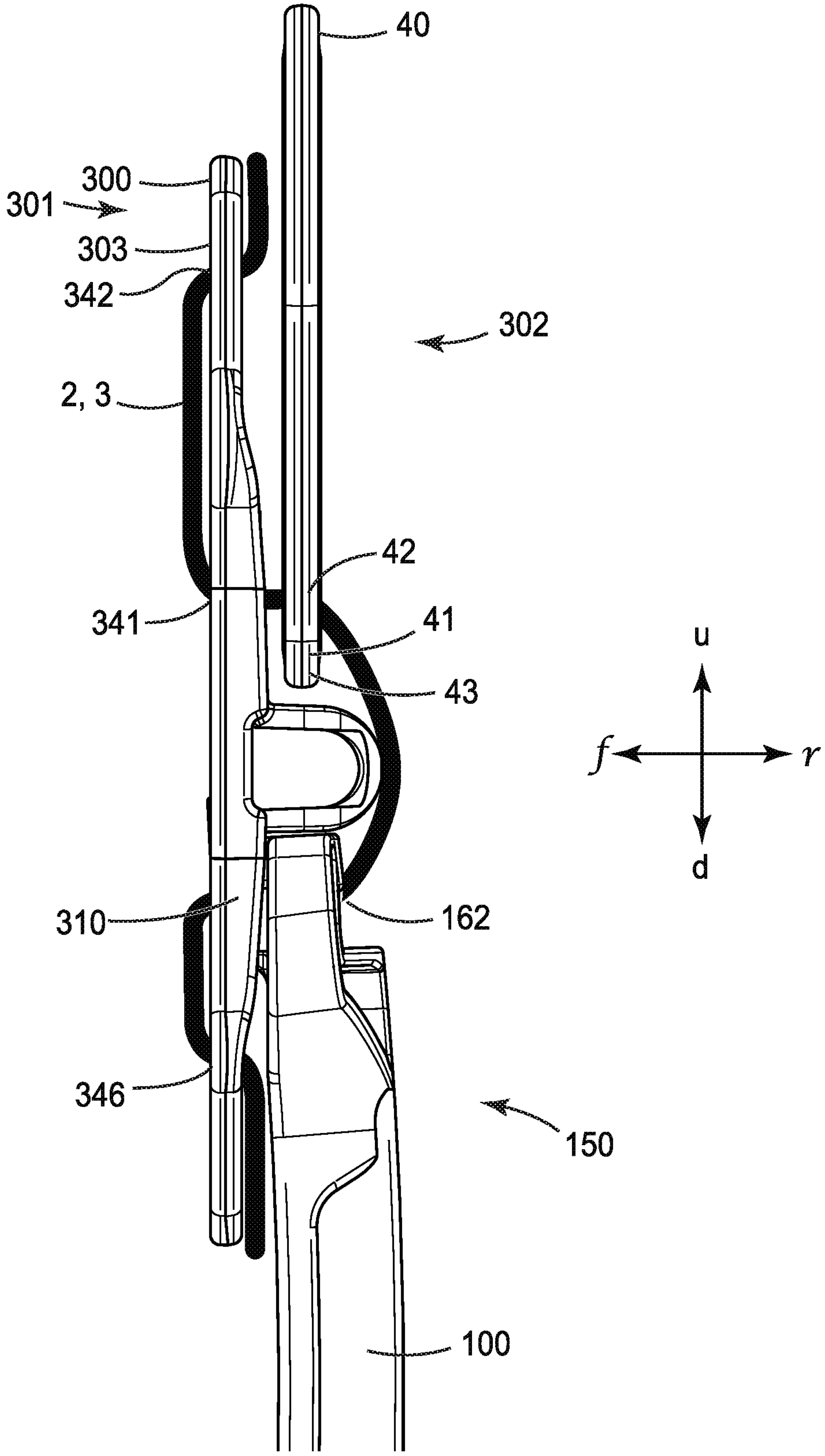
FIG. 5 is a side view (viewed along the lateral direction) of the upper portion of an exemplary dorsal brace, and an exemplary dorsal plate to which the dorsal brace is fastened.

In the herein-disclosed arrangements, a fastener 150 is provided at upper end 101 of dorsal brace 100 that allows upper end 101 of brace 100 to be fastened to a dorsal plate 300. Such an arrangement is depicted in exemplary, generic representation in FIG. 3. FIG. 4 presents a magnified view of the upper end of brace 100 and of plate 300; FIG. 5 presents a side view of these items (and also includes portions of shoulder straps 2 and 3). As noted above, in many embodiments fastener 150 may be an integral portion of brace 100, i.e., will extend integrally from elongate member 105 of brace 100.

Fastener 150 is fastenable to dorsal plate 300; furthermore, by definition, fastener 150 is "self-lockable" to dorsal plate 300. By self-lockable (and like terms such as self-locking, self-locked, etc.) is meant that the fastening of fastener 150 to plate 300 is achieved purely by way of components and features that are integral to fastener 150, working in combination with components and features that are integral to plate 300. In other words, such fastening does not require, or rely on, the use of any additional entities, e.g., separately-made mechanical fasteners such as one or more pins, rods, bolts, screws, clips, clamps, buckles, bands, binders, staples, latches, rivets, cords, and so on. Thus, the arrangements disclosed herein are distinguished from arrangements in which, for example, an upper end of a brace is seated into a receptacle in a dorsal plate and secured thereto with a mechanical fastener such as, e.g., a cotter pin or R-clip.

By self-lockable is further meant that fastener 150 and dorsal plate 300 are configured to engage with each other so as to lock together "automatically", purely as a result of moving these two items relative to each other (e.g., by pressing fastener 150 against plate 300, e.g., in the general manner depicted in FIG. 6 and as discussed in detail later herein). In other words, no individual manipulation of any portion or component of fastener 150 or dorsal plate 300, relative to some other portion of fastener 150 or plate 300, is required in order to achieve the fastening. In fact, the fastening may be accomplished without any need for the user to come into contact with fastener 150 during or after the fastening process. For example, it is not necessary to, e.g., individually press, rotate, twist, lock; or, in general, to directly individually manipulate, any component of fastener 150, or of plate 300, in order to achieve the fastening.

Unlike the term "connect", which can be either direct or indirect, the concept of fastening a fastener 150 of a brace 100 to a dorsal plate 300, is required to be "direct"; that is, fastener 150 will be engaged directly to plate 300 rather than, e.g., being engaged to some item or entity that is itself engaged to plate 300.

Figure 6:
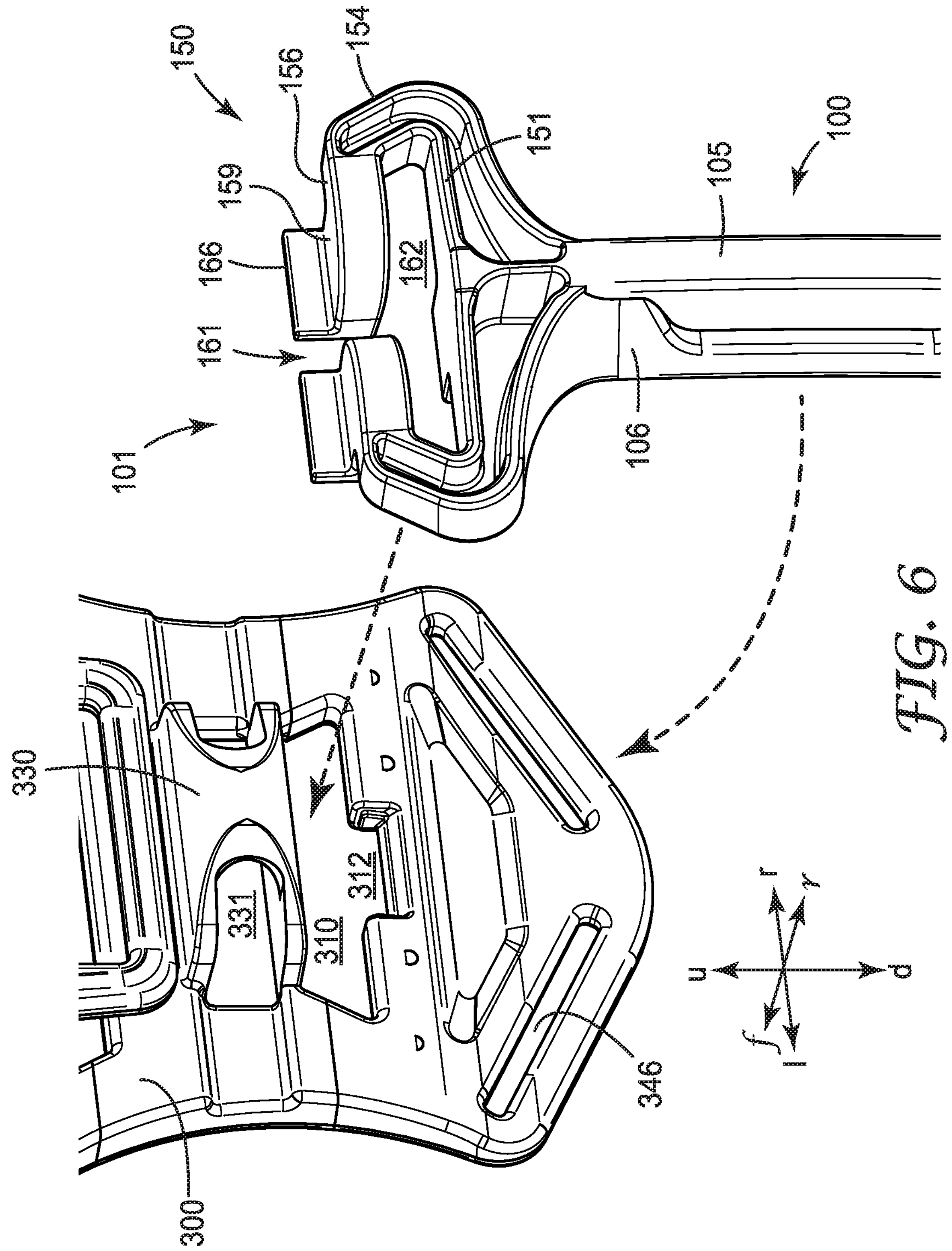
FIG. 6 is a side-rear view of an upper portion of an exemplary dorsal brace and a portion of an exemplary dorsal plate, in preparation for being fastened together.

To facilitate a brief discussion of the process of fastening fastener 150 to dorsal plate 300, portions of upper end 101 of brace 100 (including fastener 150) and of dorsal plate 300, are shown in FIG. 6. In this figure, these items are ready to be brought together to achieve the desired fastening, e.g., to provide an arrangement of the general type shown in FIGS. 3-5. In brief summary, dorsal plate 300 may comprise a forward-rearward through-opening 310 that is configured to receive allow certain portions of fastener 150 of brace 100 to pass therethrough and/or to reside therein. Fastener 150 may comprise at least one tab 166, extending upward from at least one shelf 159, and may further comprise at least one locking hook 170 (most easily seen in the side view of FIG. 11) that is spaced apart from the at least one tab 166. To perform the fastening, upper end 101 of brace 100 may be tilted slightly forward (relative to its vertical orientation in FIG. 6), and moved forward in the general direction indicated by the straight block arrow of FIG. 6 so that tab 166 moves into through-opening 310. Brace 100 may then be rotated in the general manner indicated by the curved block arrow of FIG. 6, so that locking hook 170 of fastener 150 is seated in notch 312 of plate 300. The result is that fastener 150 is self-locked to plate 300 in the general manner shown in FIG. 4 (in side-rear view), in FIG. 5 (in side view), and in FIG. 7 (in side-front view).

Features and functionalities of fastener 150 of brace 100 will now be described and discussed in further detail. With reference to FIGS. 3 and 6, in some exemplary embodiments, fastener 150 may comprise an elongate beam 151 that extends (e.g., that integrally extends) in a generally lateral direction from upper end 106 of elongate member 105 of dorsal brace 100, and at least one spar 154 that extends generally upward from elongate beam 151. Fastener 150 may further comprise at least one strut 156 that extends in a generally lateral direction from an upper end of the at least one spar 154, and at least one shelf 159 that extends generally forward from at least a portion of the at least one strut 156. Fastener 150 may further comprise at least one tab 166 that extends generally upward from at least a portion of the at least one shelf 159. As noted, in some embodiments all such items may be portions of an integral fastener 150 of an integrally molded brace 100.

Figure 8:
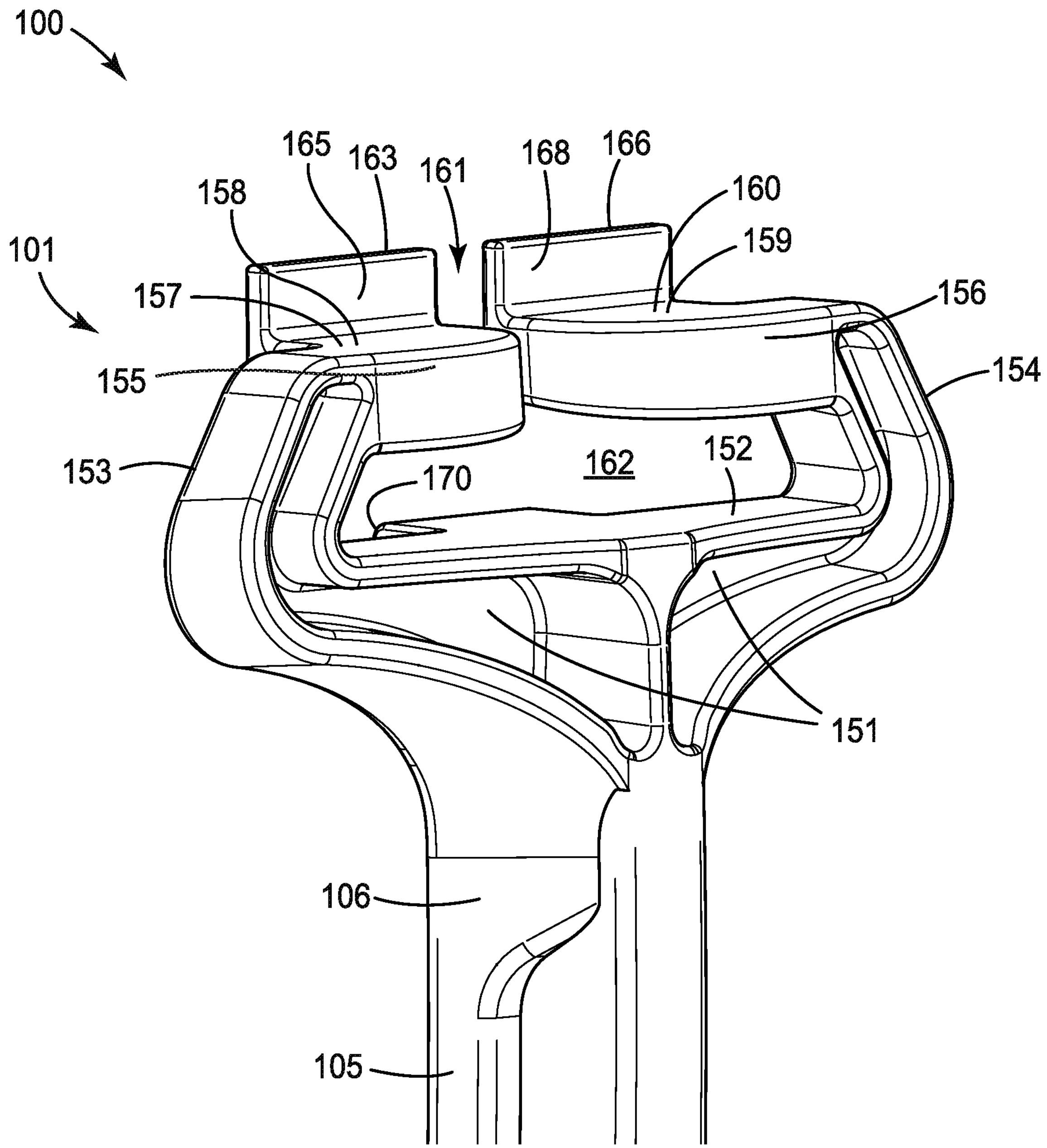
FIG. 8 is a side-rear isolated view of an upper portion of an exemplary dorsal brace.

In some embodiments, fastener 150 may comprise two (e.g., left and right) spars (153 and 154), struts (155 and 156), shelves (157 and 159), and/or tabs (163 and 166). These and other features of fastener 150 are illustrated from various viewpoints in FIGS. 8-11. In some embodiments, the laterally-inwardmost surfaces of the left and right tabs, shelves, and/or struts may define a generally vertically oriented slot 161 (seen most clearly in FIG. 10, but also visible in FIGS. 6 and 8-9). The presence of such a slot 161 can allow sections of left and right shoulder straps 2 and 3 to be passed edge-wise through slot 161 during a process of installing the dorsal brace on the safety harness. This can then allow portions of left and right shoulder straps 2 and 3 to reside within forward-rearward through-opening 162 (seen most easily in FIG. 10) defined by the various spars, struts, and/or shelves of connector 150. That is, after installation of dorsal brace 100 onto harness 1, left and right shoulder straps 2 and 3 can extend longitudinally through opening 162 in the general manner indicated in FIG. 5.

Figure 9:
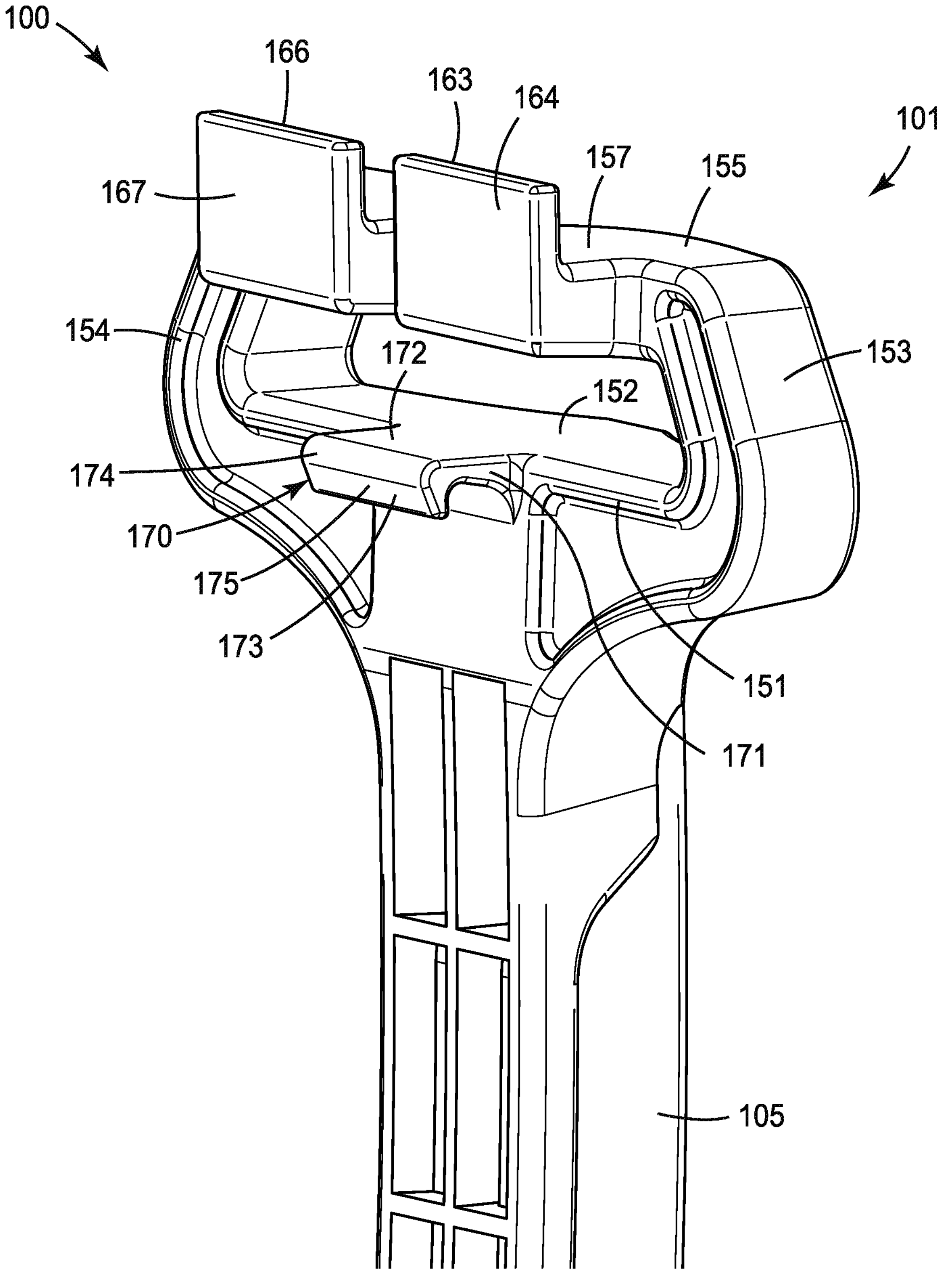
FIG. 9 is a side-front isolated view of the upper portion of the dorsal brace of FIG. 8.
Figure 10:
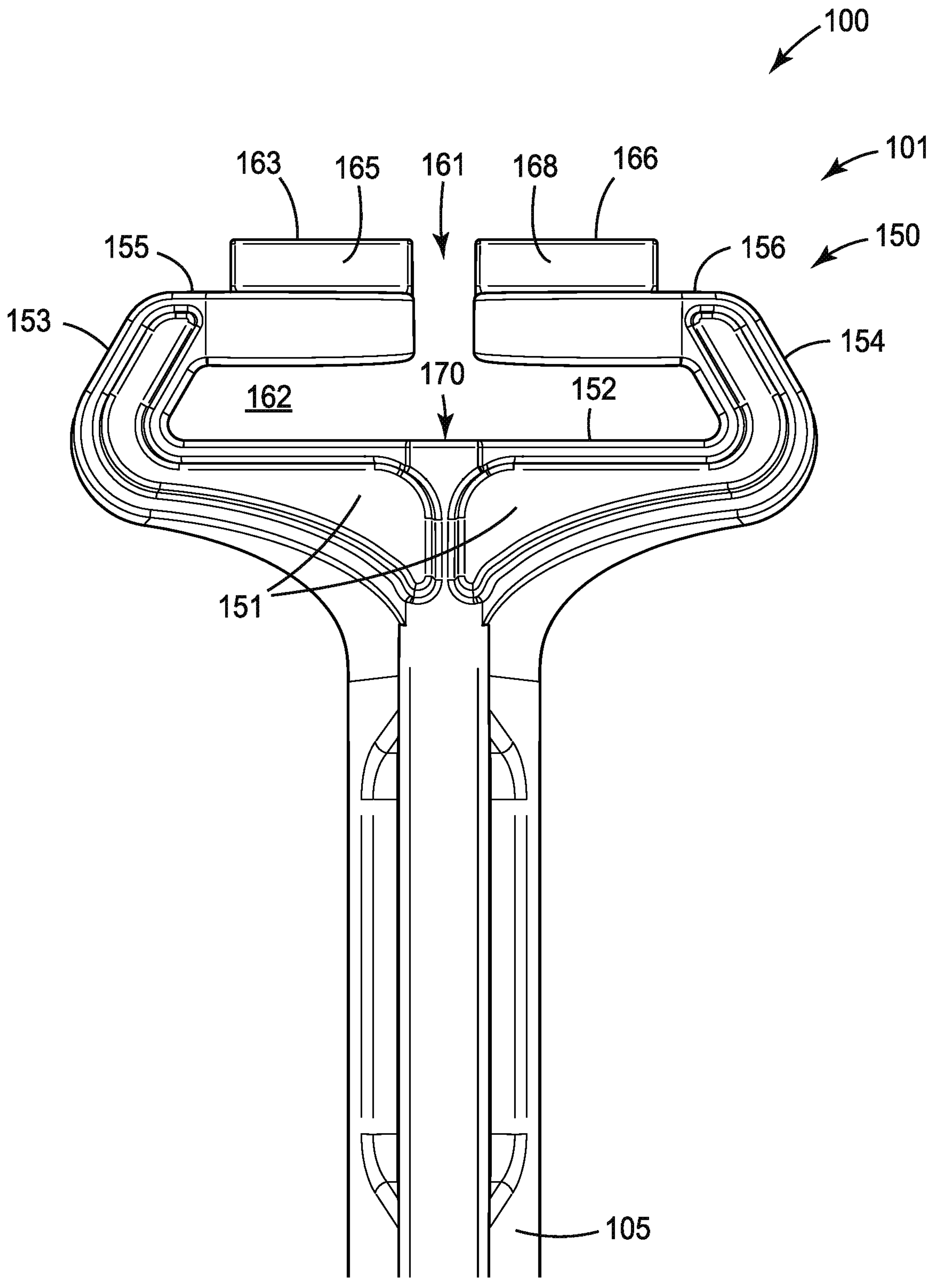
FIG. 10 is a rear isolated view of the upper portion of the dorsal brace of FIG. 8.
Figure 11:
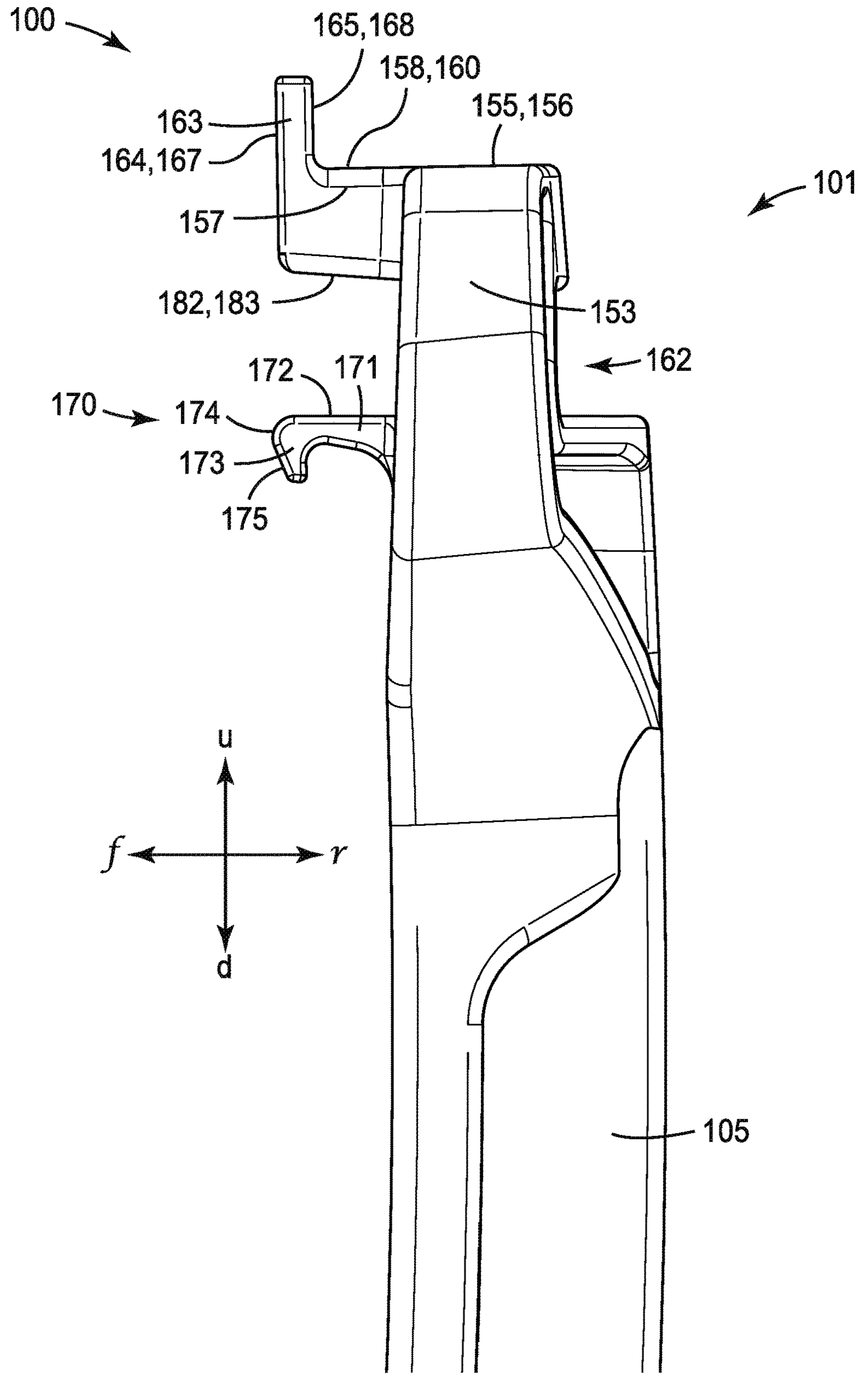
FIG. 11 is a side isolated view (viewed along the lateral axis, from the left) of the upper portion of the dorsal brace of FIG. 8.

In some embodiments, fastener 150 comprises a forwardly-protruding locking hook 170 (most easily seen in FIGS. 9 and 11). In some embodiments, locking hook 170 may be below, and spaced apart from, left and right shelves 157 and 159. In some embodiments, locking hook 170 may comprise a flange 171 that extends generally forward from a forward edge of elongate beam 151; and, a locking lip 173 that extends generally downward from a forward edge of flange 171. In some embodiments a top surface 172 of flange 171 may be planar and may be generally parallel to lower surfaces 182 and 183 of left and right shelves 157 and 159, as in FIG. 11. In some embodiments, top surface 172 of flange 171 may be extend from, and be at least generally coplanar with, top surface 152 of elongate beam 151, as in the exemplary design of FIG. 8.

In some embodiments, a forwardmost surface 174 of locking hook 170 may be coplanar with (along a generally forward-rearward direction), or may be rearwardly recessed from 0.1 mm to 1.0 mm relative to, a forward surface of the at least one tab of fastener 150, for reasons that will become clear later. (An exemplary embodiment in which forwardmost surface 174 of hook 170 is coplanar with forward surfaces 164 and 167 of left and right tabs 163 and 166 is depicted in FIG. 11.) In many embodiments, locking hook 170 may be integrally formed with the other components of fastener 150; e.g., hook 170 may extend integrally from elongate beam 151 as evident in FIG. 9.

Figure 12:
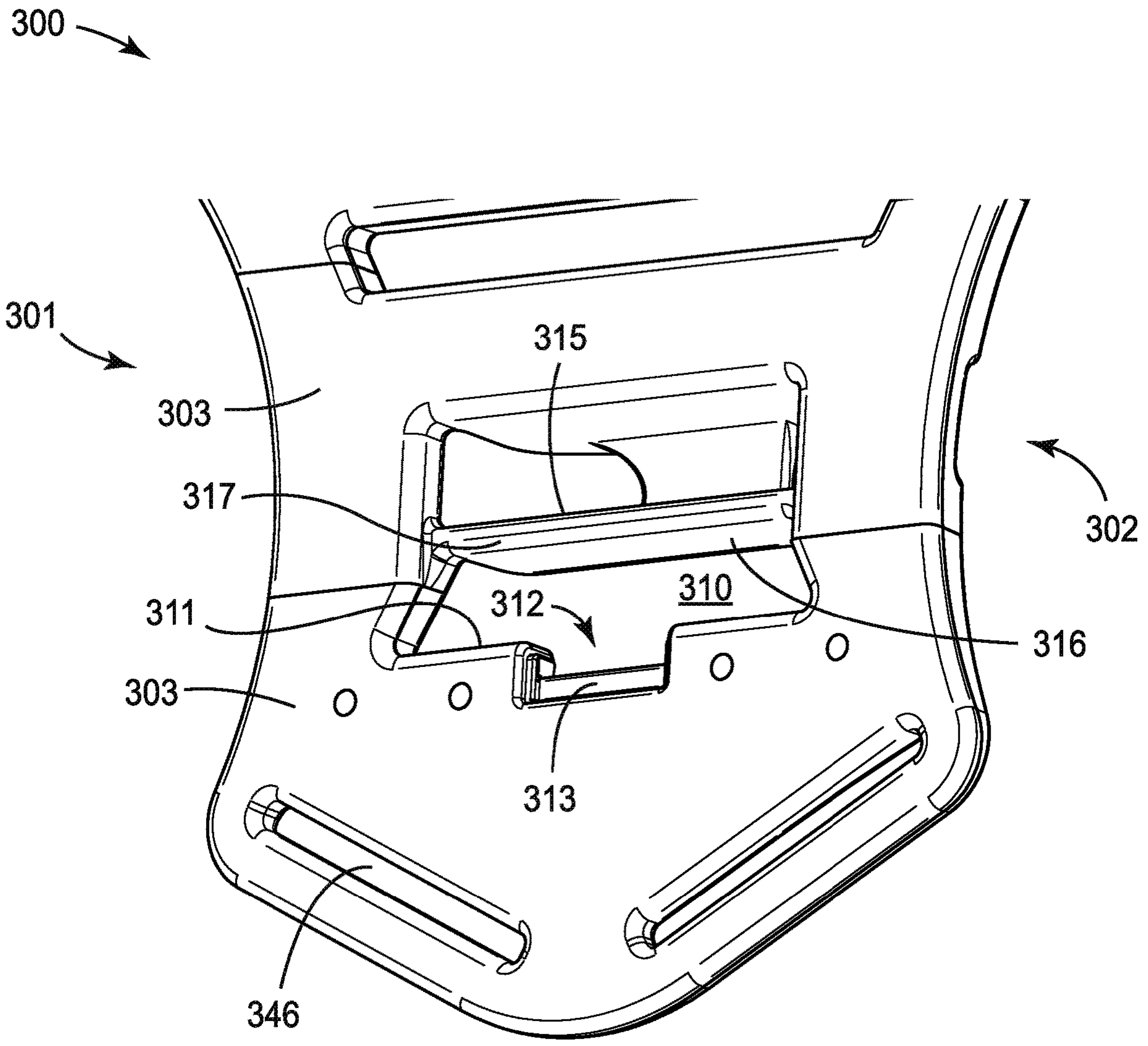
FIG. 12 is a side-front view of a portion of an exemplary dorsal plate to which a dorsal brace may be fastened.
Figure 13:
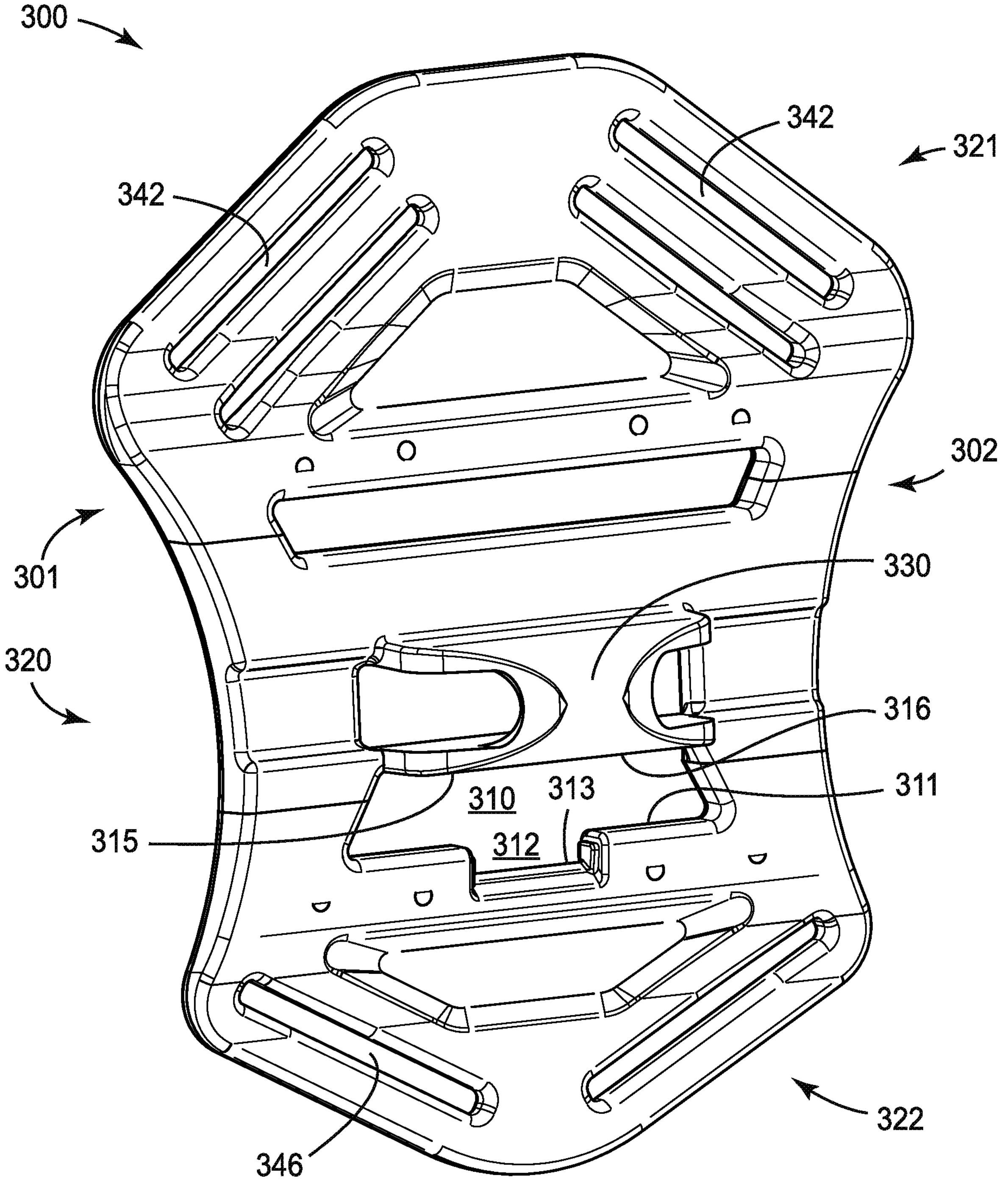
FIG. 13 is a side-rear view of an exemplary dorsal plate.

As noted earlier, dorsal plate 300 comprises a forward-rearward through-opening 310 that is configured (i.e., shaped and sized) so that various components of fastener 150 can be passed thereinto and/or therethrough, in order to accomplish the desired fastening. With reference to FIGS. 12 and 13, in some embodiments, through-opening 310 comprises (i.e., is partially defined by) an upper, generally laterally-extending lintel 315 and a lower, generally laterally-extending sill 311. That is, lintel 315 may define an upper edge of opening 310 and sill 311 may define a lower edge of opening 310.

A portion of sill 311 may be interrupted by a laterally-extending notch 312 in which a locking flange 313 defines the lower edge of notch 312, as seen in FIGS. 12 and 13. Notch 312 (whose vertical depth and lateral width can be chosen as desired) is configured to receive locking hook 170 of fastener 150 so that when fastener 150 is fastened to plate 300, the afore-mentioned locking lip 173 of locking hook 170 forwardly abuts locking flange 313, in the general manner of FIG. 7. Through-opening 310 may be additionally defined by lateral edges as visible, e.g., in FIG. 13.

The process of installing a dorsal brace 100 on harness 1 will now be described in additional detail. The process is typically performed with dorsal plate 300 (which is typically factory-installed) present. Ordinary artisans will readily appreciate how a dorsal plate can be installed during manufacture of a safety harness 1. With reference to FIGS. 4, 5 and 13, typically a left shoulder strap 2 will approach plate 300 from the upper left, and may pass forward through an upper auxiliary strap guide 342. The strap may pass downward along the forward side 301 of plate 300 and then emerge rearwardly through through-opening 341 which is provided for this purpose. If a D-ring 40 is present (as in FIG. 5), the strap may then pass rearwardly through a slot 42 in D-ring 40 which is provided for this purpose. Then strap may then continue downward (passing in front of sleeve 330 if present) and will then pass forwardly through through-opening 310. The strap may then continue downward along the forward side 301 of plate 300 and then emerge rearwardly through a lower auxiliary strap guide 346. (Such strap arrangements are depicted in FIG. 5, ignoring for now the presence of brace 100 and fastener 150 thereof.) Typically, a left shoulder strap will approach plate 300 from the upper left and will depart plate 300 on the lower right. A right shoulder strap 3 will follow a similar course except approaching from the upper right and departing on the lower left, so that the left and right shoulder straps cross (thus exhibiting the previously-described dorsal crossing point 10) in the general manner shown in FIGS. 1 and 2.

With a dorsal plate 300 mounted on shoulder straps 2 and 3 of a harness 1 in the general manner described above, a dorsal brace 100 can be installed (plate 300 is typically factory-installed; in some embodiments brace 100 may be installed in the field, e.g., a considerable time after plate 300 was installed). In order to install brace 100, the portions of left and right shoulder straps 2 and 3 that pass rearward of dorsal plate 300 can be loosened (pulled through the various slots of plate 300) so that they protrude (bulge) far enough rearward from plate 300 to have a sufficient amount of play to be manipulated. The loose portions of straps 2 and 3 can then be passed edgewise through slot 161 of fastener 150 of brace 100 so that they reside in, and extend longitudinally through, through-opening 162 of fastener 150. With this preliminary step accomplished, fastener 150 can now be fastened to dorsal plate 300.

As mentioned earlier with reference to FIG. 6, the fastening of fastener 150 to dorsal plate 300 can be accomplished by momentarily tilting brace 100 so that upper end 101 of brace 100 is angled forward, and then moving upper end 101 and fastener 150 forward so that tabs 163 and 166 of fastener 150 enter through-opening 310 of plate 300, passing below upper lintel 315 of plate 300. The lower end 140 of brace 100 can then be rotated forward so that the forward end of locking hook 170 passes into notch 312 so that locking lip 173 of hook 170 impinges on locking flange 313 that defines the lower edge of notch 312. Continued forward pressure will cause sufficient deflection of one or more components of fastener 150 that locking lip 173 is able to penetrate forwardly past locking flange 313 by passing over flange 313. When hook 170 has penetrated sufficiently far forward, hook 170 will snap downward into place into a seated (engaged) configuration in which locking lip 173 resides forwardly of locking flange 313. Tabs 163 and 166 of fastener 150 of brace 100 are now in place, residing forwardly of forward edge 317 (visible in FIG. 12) of upper lintel 315 of plate 300. Fastener 150 is now self-locked in place on brace 300, with no individual manipulation of any component of fastener 150 (or brace 300) having been required and with no additional mechanical fastener (e.g., a separately-made pin, clamp, or the like) needing to be used to hold fastener 150 in place.

After fastener 150 has been self-locked to dorsal plate 300, shoulder straps 2 and 3 can be snugged tight as necessary. At this point, the self-locked assembly of dorsal plate 300 and dorsal brace 100 will resemble the arrangement shown in FIG. 5, which shows portions of shoulder straps 2 and 3 following paths as described above. Straps 2 and 3 now also extend through through-opening 162 of fastener 150. Thus, in many embodiments, with brace 100 installed as described above, through-opening 162 of fastener 150 of dorsal brace 100 will be at least partially aligned (along a forward-rearward direction) with through-opening 310 of dorsal plate 300 to allow straps 2 and 3 to extend therethrough, as is evident in FIGS. 4 and 5.

Figure 7:
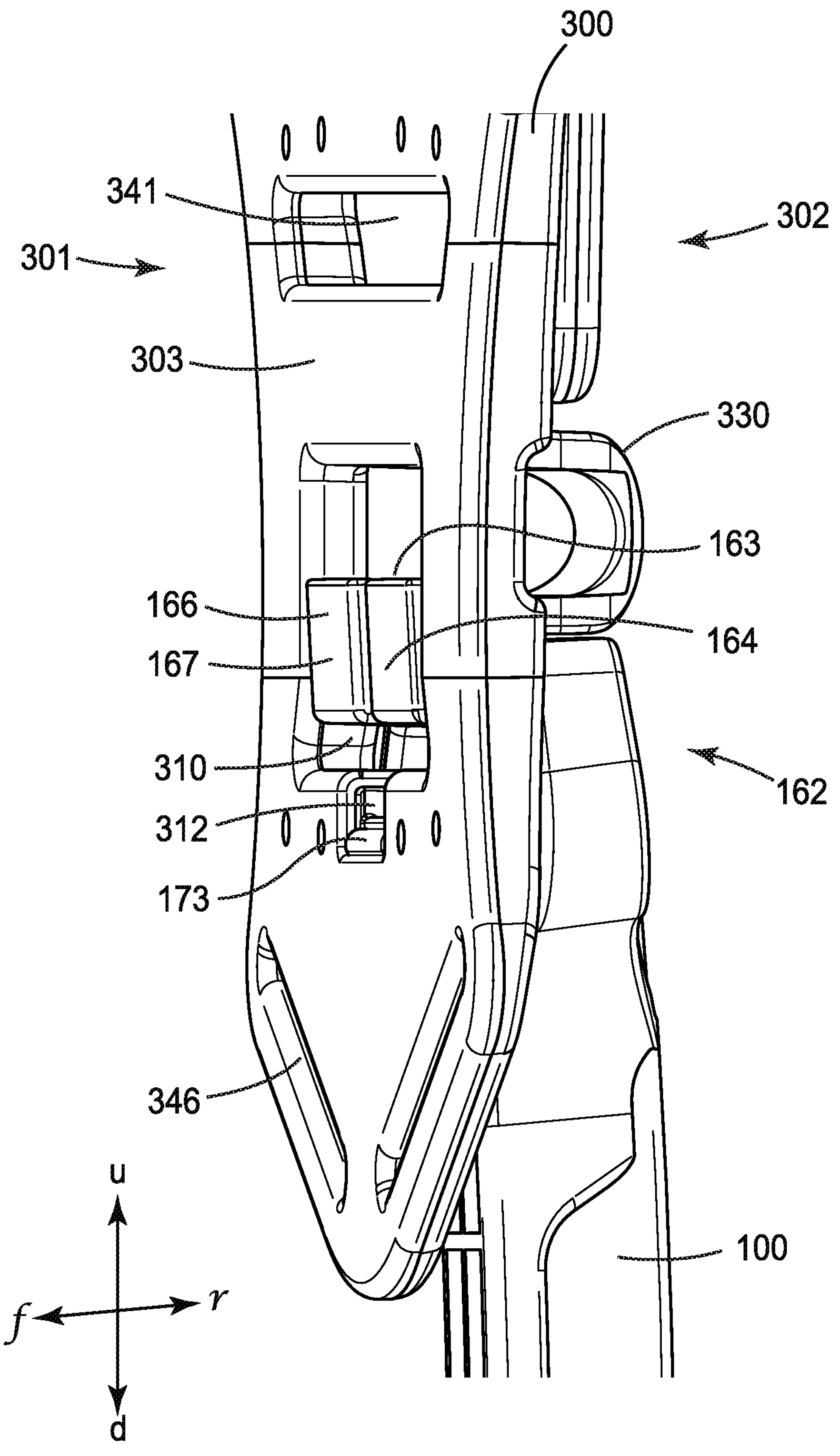
FIG. 7 is a side-front view of an upper portion of an exemplary dorsal brace, and a portion of an exemplary dorsal plate to which the dorsal brace is fastened.

Other features of the herein-described arrangement of dorsal plate 300 and fastener 150 of dorsal brace 100 are visible in FIG. 7. As noted, dorsal plate 300 comprises a rearward side 302 and a forward side 301. Since forward side 301 faces toward the back of the person wearing harness 1, it can be advantageous for forward side 301 to present a major forward surface 303 that is relatively uniform, e.g., smooth and/or planar. Inspection of FIG. 7 reveals that when fastener 150 is in place on dorsal plate 300, forward surfaces 164 and 167 of tabs 163 and 166 of fastener 150 may be positioned so that they are at least generally coplanar with major surface 303 of plate 300. By at least generally coplanar means within 1.0 mm (along a forward-rearward direction) of the nearest portions of major surface 303. This can ensure that the tabs do not extend forwardly beyond major surface 303 so as to cause any pressure points that might be uncomfortable for the user. (Similarly, the previously-mentioned arrangement in which forwardmost point 174 of locking hook 170 is either coplanar with surfaces 164 and 167 of the tabs, or is recessed rearwardly relative thereto, can ensure that looking hook 170 does not protrude so far forward as to cause any uncomfortable pressure points.)

To achieve an arrangement in which forward surfaces 164 and 167 of tabs 163 and 166 are not positioned forward of major surface 303 of plate 300, forward edge 317 of upper lintel 315 of plate 300 can be recessed rearwardly relative to major surface 303 of plate 300 to provide a space that can be occupied by tabs 163 and 166. Such an arrangement can be seen in FIG. 12. Thus in some embodiments, forward surface 317 of upper lintel 315 may be recessed rearwardly relative to major forward surface 303 of dorsal plate 300, a distance that is within plus or minus 20% of the (maximum) thickness of tabs 163 and 166 of fastener 150. When fastener 150 is fastened (and self-locked) to dorsal plate 300 in this manner, rear surfaces 165 and 168 (as visible in FIG. 8) of tabs 163 and 166 will forwardly abut forward surface 317 (as visible in FIG. 12) of upper lintel 315.

Lower end 140 of dorsal brace 100 may be connected to waist strap 5 (e.g., to a waist plate 7 that is mounted on waist strap 5), e.g., before or after the upper end 101 of brace 100 is connected to dorsal plate 300. (In other words, the connecting of the upper end of the brace 100 to dorsal plate 300 and the connecting of the lower end of brace 100 to a waist strap can be performed in any desired order.)

The configuration of various components of fastener 150 (e.g., the various tabs, shelves, struts, and/or spars, as well as the locking hook), encompassing both their individual design and their relationship with the other components of fastener 150, may be chosen to allow a degree of deflectability that allows the above-described fastening to be carried out. That is, locking hook 170, and/or any or all of the various tabs, shelves, etc., may exhibit sufficient deflectability to allow the self-locking to be performed. With reference to the side view of fastener 150 in FIG. 11, tabs 163 and 166 may deflect slightly forward, shelves 157 and 159 may deflect slightly downward, and/or locking hook 170 may deflect slightly upward, as the forward end of hook 170 penetrates forwardly past locking flange 313 of the dorsal plate.

In at least some embodiments, this ability may result from a slight deflectability of multiple components of fastener 150, operating in combination. This can be contrasted with relying on any single component (e.g., hook 170) to be deflectable while others remain undeflected. In other words, in some embodiments the geometric properties of all of these components, along with the material of which they are made, can be chosen so that the entire fastener 150 exhibits the desired deflectability to allow self-locking. As noted earlier, in some embodiments (e.g., in which fastener 150 is integral with elongate member 105 of brace 100) the same material (e.g., a molded resin) may be used for both elongate member 105 and for all components of fastener 150. In such embodiments, the geometric properties of these components can be chosen so that the fastener exhibits the desired deflectability while the elongate member nevertheless exhibits the desired rigidity. It is emphasized that the deflectability that is needed to allow the self-locking to occur may be relatively small (e.g., no individual component of fastener 150 may need to be deflected more than, e.g., a millimeter or so in order to perform the self-locking). Thus, a material that is characterized herein as "rigid" may be used for brace 100, with an integral fastener 150 of the brace nevertheless being sufficiently deflectable to allow the self-locking to take place.

In some embodiments, fastener 150 and dorsal plate 300 may be configured so that the fastening of fastener 150 to plate 300 provides a self-locked connection that is permanent, meaning that in ordinary use of harness 1, the connection is not intended to be disconnectable by a user. In other embodiments, fastener 150 and dorsal plate 300 may be configured so that fastener 150 (and thus brace 100) is disconnectable from dorsal plate 300. In such embodiments, a user may need to loosen shoulder straps so that the forward side 301 of dorsal plate 300 is accessible. The user may then reverse the above-described process, including a step of urging brace 100 upward relative to dorsal plate 300 to allow clearance for unlocking hook 170 to release from locking flange 313. In some embodiments, it may be helpful to use a small pry bar or tool to assist in deflecting the forward end of locking hook 170 upward so that locking lip 173 of hook 170 is clear of locking flange 313 of plate 300, in order to perform the disconnection. Thus, even in embodiments in which brace 100 is disconnectable from dorsal plate 300, brace 100 may not necessarily be self-unlockable from plate 300. The specific configuration of brace 100 and plate 300; in particular, whether brace 100 and plate 300 are configured to be disconnectable from each other by a user in ordinary use of harness 1 (and if so, the procedure to be used for disconnection) may be specified in instructions provided to the end user.

Figure 14:
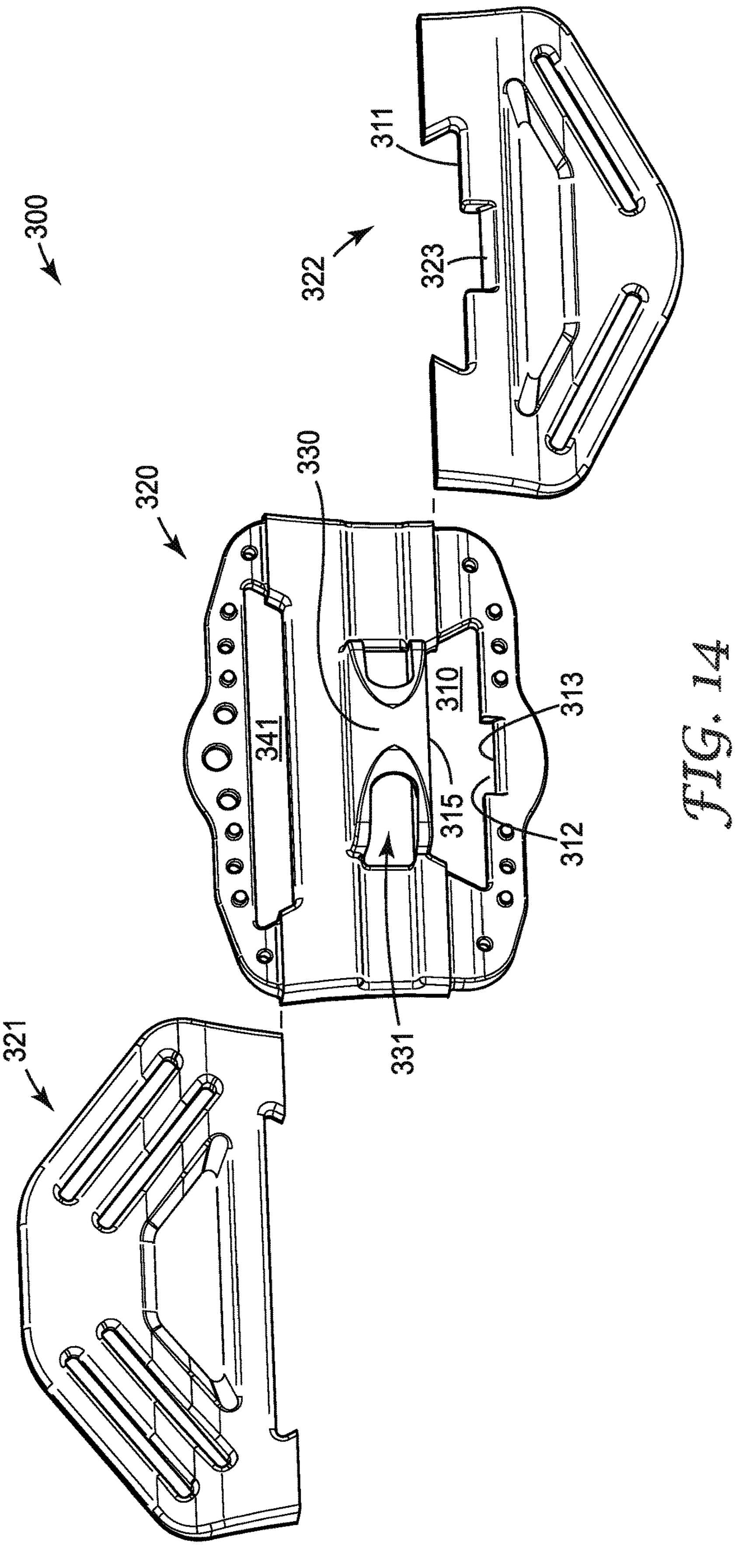
FIG. 14 is a side-rear exploded view showing a main body, and upper and lower extensions, of the exemplary dorsal plate of FIGS. 12 and 13.

Dorsal plate 300 (as shown isolated view in exemplary embodiment in FIG. 13) may comprise any suitable design (e.g., shape, thickness, aspect ratio, number, size and arrangement of through-openings, slots, reinforcing ribs, and so on) that allows the herein-described arrangements to be achieved. In some embodiments the entirety of dorsal plate 300 may consist of a single unit, e.g., a single injection-molded piece made by molding an thermoplastic organic polymeric resin. However, in some embodiments, dorsal plate 300 may take the form of a multipart structure as shown in exemplary embodiment in the exploded view of FIG. 14. In such embodiments, dorsal plate 300 may comprise a central main body 320 that is rigid (e.g., comprised of an organic polymeric material with a flexural modulus of at least, e.g., 1.0, 2.0, 3.0, 4.0, 5.0, 10, 15 or 20 GPa). In further embodiments the central main body may be comprised of an organic polymeric material with a flexural modulus of at most 30, 25, 18, 13, or 8.0 GPa.

Dorsal plate 300 may further comprise a flexible upper extension 321 and/or a flexible lower extension 322. In some embodiments, such extensions may be comprised of an organic polymeric material with a flexural modulus of less than 1.0 GPa. In further embodiments, any such flexible extension may be comprised of an organic polymeric material with a flexural modulus of less than 0.8, 0.5, 0.3, 0.2, or 0.1 GPa. (Such a material may have any appropriate minimum flexural modulus, e.g., 0.05 GPa.) In some convenient embodiments any such flexible extension (321 and/or 322) may be overmolded onto a previously-molded rigid main body 320. Various features may be provided (e.g., apertures as visible in FIG. 14) in main body 320 to enhance the bonding of any such overmolded extension to main body 320. In various embodiments, an overmolded flexible extension may be comprised of any suitable organic polymeric resin, e.g., thermoplastic elastomer, thermoplastic vulcanizate, polyurethane, natural or synthetic rubber, and so on.

Making upper and/or lower sections 321 and/or 322 of dorsal plate 300 of a relatively flexible material in this manner can allow dorsal plate 300 as a whole to more easily conform to the shape of the user's back, which can enhance the comfort of harness 1. However, it can be advantageous that the portion of plate 300 that defines through-opening 310 into which fastener 150 of brace 100 is fitted, be relatively rigid so that fastener 150 of brace 100 is able to self-lock securely thereto. Thus in some embodiments, portions of (rigid) main body 320 may circumscribe all four sides of through-opening 310 of the dorsal plate, in the manner illustrated in FIG. 14. In some particular embodiments, at least one edge of opening 310 may comprise a thin overmolded layer of the above-described flexible material that overlies the rigid main body material, as will be evident from FIG. 14. Still further, it may be advantageous that locking flange 313 of dorsal plate 300 (to which locking hook 170 of brace 100 is engaged) may be made of rigid material rather than flexible material, in order to enhance the ability of locking flange 313 to hold locking lip 173 of hook 170 in place. Thus in embodiments of the type illustrated in FIG. 14, locking flange 313 that defines the lower edge of notch 312 may be provided by an exposed portion of rigid main body 320 of dorsal plate 300. This exposed portion of rigid main body 320 will protrude upward beyond any portion or portions 323 (as visible in FIG. 14) of flexible lower extension 322 that may neighbor the exposed portion 313 of the rigid main body. In other words, while notch 312 as shown in FIG. 13 may be defined in part by a portion 323 of flexible lower extension 322, at least locking flange 313 may be provided by a portion of rigid main body 320, as exemplified by the arrangements shown in FIG. 14.

A fall-protection safety harness 1 as disclosed herein is often used to provide a dorsal connection point at which a safety line (e.g., a lanyard, or a cable of a self-retracting lifeline) or a safety device (e.g., a personal self-retracting lifeline) can be connected to the harness. Connecting to the harness at this location can provide that, as a user goes about work activities, the line (or device) remains generally behind the user's back so that it does not unduly interfere with the work activities. In many convenient embodiments, a dorsal connection point can take the form of a D-ring (e.g., comprised of metal such as steel, aluminum, any suitable alloy, and so on, so as to exhibit appropriate strength and durability). The term D-ring is a term of art in common use and artisans in the field will appreciate that such an item may vary in size, shape, geometry, and so on.

Thus in some embodiments a dorsal D-ring 40 may be provided proximate dorsal plate 300, as illustrated in exemplary embodiment in FIGS. 1-4. In some such embodiments a dorsal D-ring may be pivotable, e.g., so that the D-ring can be rotated into an "up" position (e.g., as in FIGS. 1-4) for ease of attaching a line to the D-ring.

Figure 15:
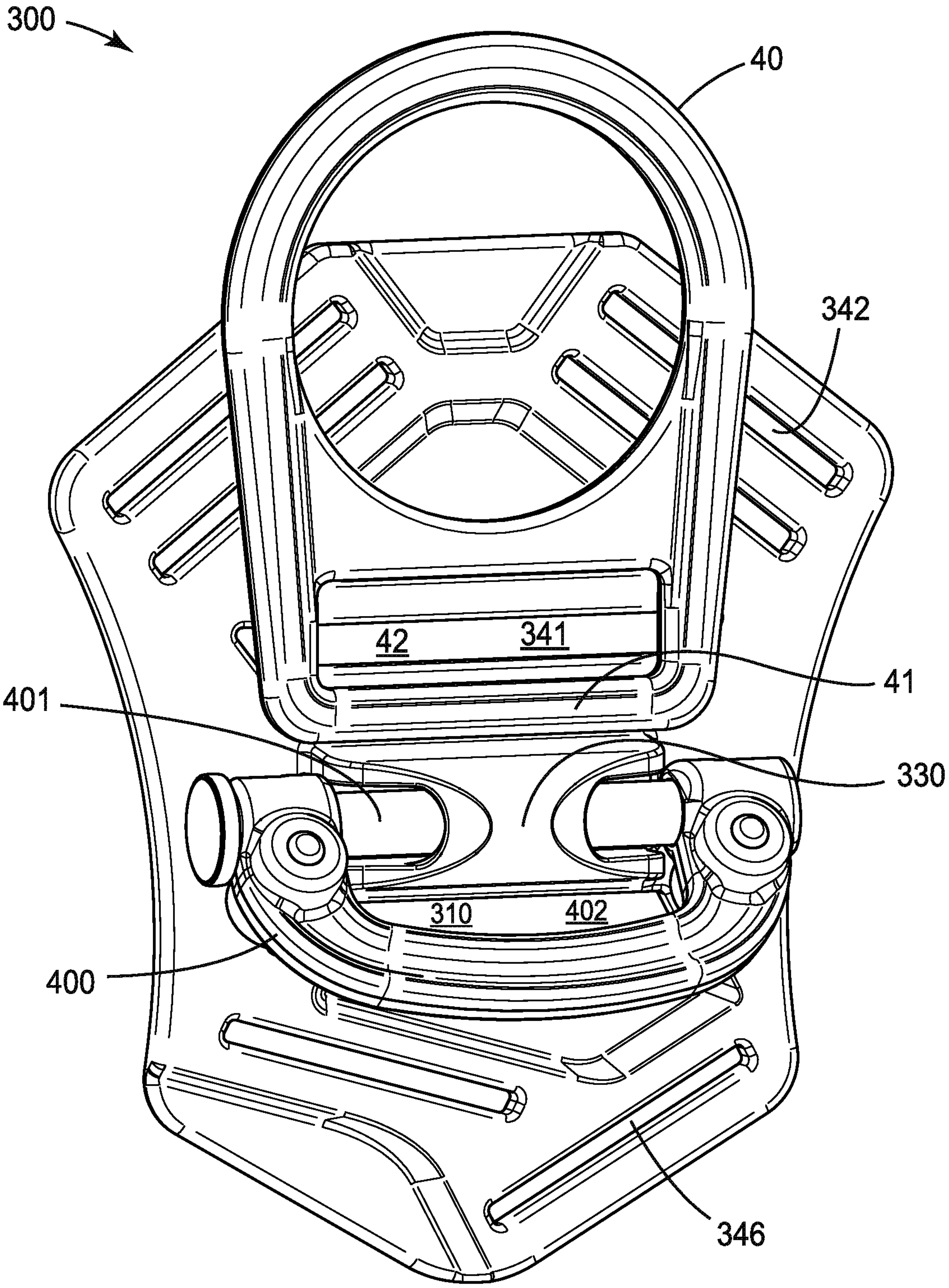
FIG. 15 is a side-rear view of an exemplary dorsal plate with a D-ring pivotally soft-connected thereto, and comprising an exemplary, integral sleeve into which is inserted an elongate member of an exemplary connector.

As shown in exemplary embodiment in FIGS. 4, 5 and 15, in some embodiments a dorsal D-ring may be held in position proximate dorsal plate 300 by way of shoulder straps 2 and 3 extending through a slot 42 provided in D-ring 40 and passing rearward of a base 43 of D-ring 40. As is evident from the side view of FIG. 5, in such an embodiment there is no item or items that would hold D-ring 40 in place proximate dorsal plate 300 in the absence of straps 2 and 3. That is, in such embodiments D-ring 40 does not have a "hard" connection to dorsal plate 300 by way of rigid or semi-rigid components. Rather, D-ring 40 comprises only a "soft" connection to dorsal plate 300, by way of the shoulder straps. In such a configuration, D-ring 40 can be rotated about a rotation axis 43 that is generally coincident with base 41 of D-ring 40. In such a configuration, the D-ring 40 is typically installed at the factory, e.g., by passing shoulder straps 2 and 3 through slot 42 in the same operation in which the straps are threaded through the various slots and guides of dorsal plate 300.

Figure 16:
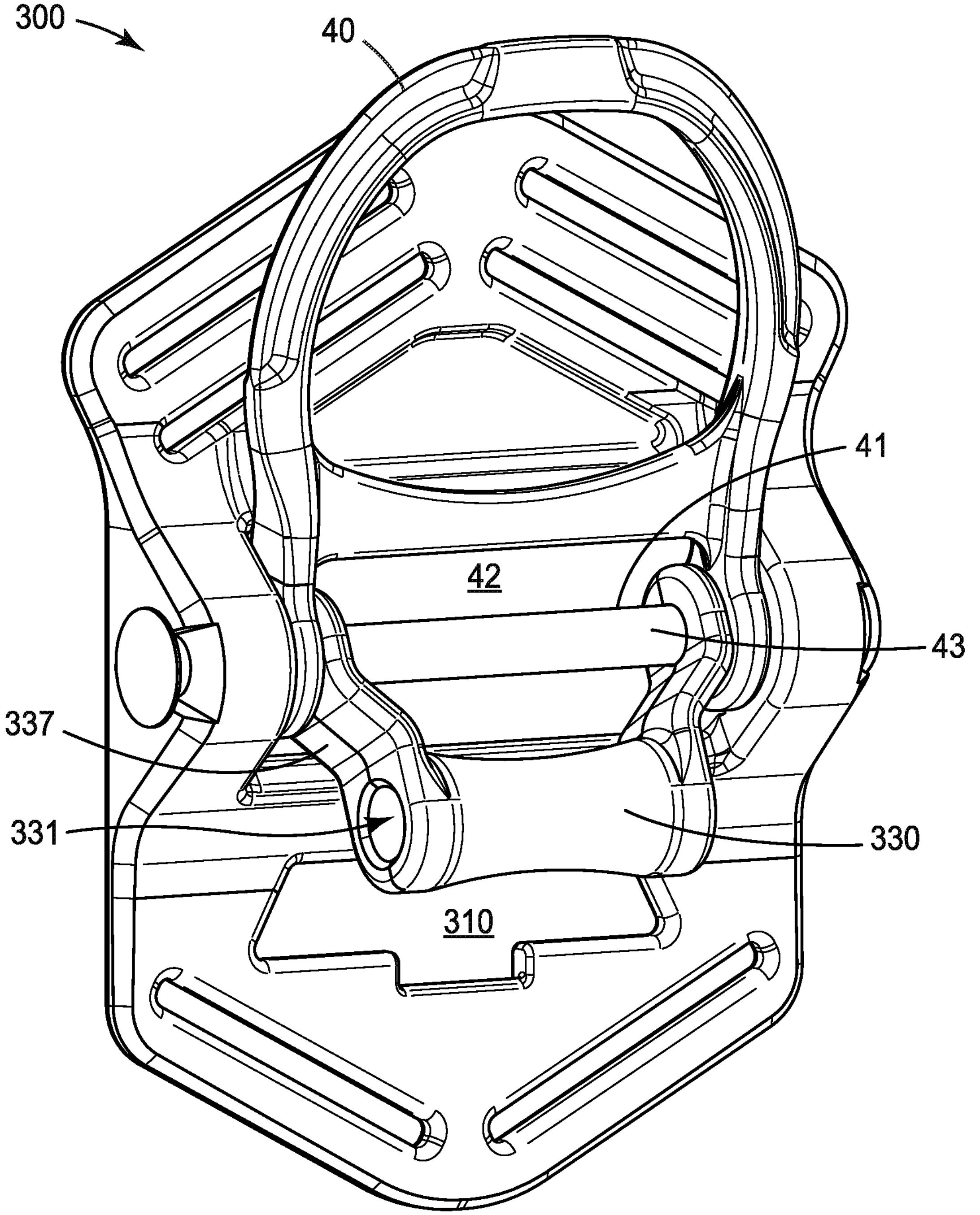
FIG. 16 is a side-rear view of another exemplary dorsal plate, with a D-ring pivotally hard-connected thereto, and comprising an exemplary sleeve that is pivotally hard-mounted on the dorsal plate.
Figure 17:
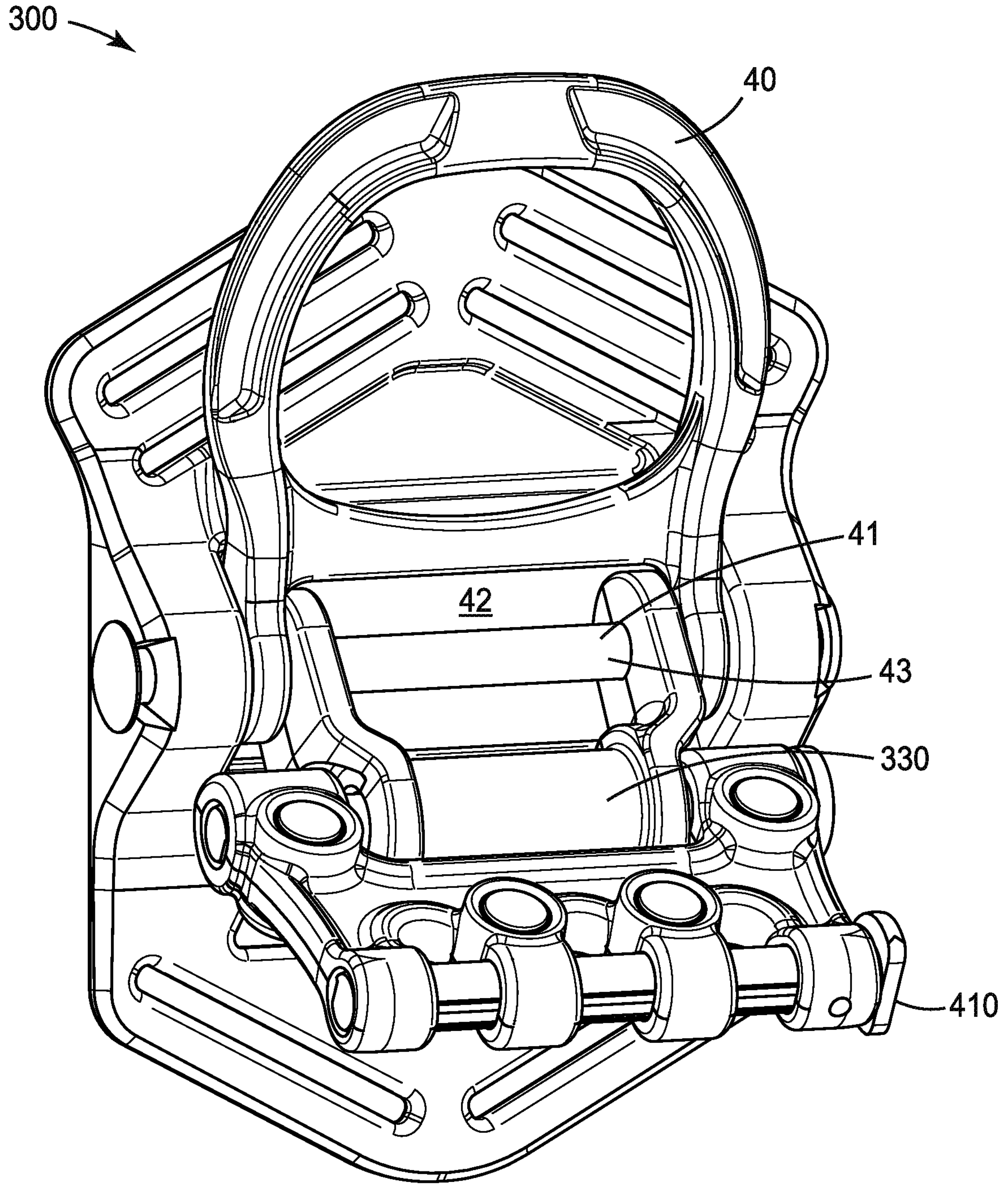
FIG. 17 is a side-rear view of another exemplary dorsal plate, with a D-ring pivotally hard-connected thereto, and comprising another exemplary sleeve that is pivotally hard-mounted on the dorsal plate, and into which is inserted an elongate member of an exemplary connector.

In other embodiments D-ring 40 may be provided with a "hard" connection to dorsal plate 300, as shown in exemplary embodiment in FIGS. 16 and 17. In an exemplary type of hard-connection, D-ring 40 may comprise (e.g., mounted on) a base (e.g., a shaft) 41 that is mounted to dorsal plate 300. For example, dorsal plate 300 may be provided with laterally-spaced, laterally-inwardly-facing receptacles that are configured to receive opposing ends of a shaft 41, as is evident from FIGS. 16 and 17. Such a D-ring 40 may be rotatable relative to shaft 41 and/or shaft 41 may be rotatably relative to dorsal plate 300. In any case, D-ring 40 is able to rotate relative to an axis of rotation 43 that is generally coincident with shaft 41. In some such embodiments D-ring 40 may be biased (e.g., by way of a torsion or coil spring) toward an upward configuration of the general type shown in FIGS. 16 and 17. In any such hard-connected configuration, the D-ring is typically installed at the factory, e.g., by mounting D-ring 40, shaft 41, etc. in place on dorsal plate 300. Typically, shoulder straps 2 and 3 extend through slot 42 and pass rearwardly of shaft 41 in a manner that will be well understood by ordinary artisans.

It will be understood that the specific shape, size and geometry of D-ring 40 and dorsal plate 300 as shown in various Figures herein, in particular the positioning of the various strap guides, slots, and so on, are merely exemplary and that any suitable variation is envisioned.

In some embodiments a D-ring 40 may be the only item or component that is associated with dorsal plate 300 that allows a dorsal connection to a safety line and/or to a safety device to be made. In other embodiments, provision may be made for some other type of connection, either instead of, or in addition to, a D-ring. In some embodiments of this general type, a sleeve (i.e., a generally tubular entity that defines a hollow space through which an elongate member of a connector can be passed) can be used. In some embodiments, a sleeve 330 may be provided that is integral to dorsal plate 300 (e.g., sleeve 330 may molded along with, and as part of, a previously-described main body 320 of plate 300). Such a sleeve 330 is shown in exemplary embodiment in FIG. 13. Sleeve 330 extends in a generally lateral direction along plate 300 and defines an elongate, laterally-extending interior space 331 therein. It will be appreciated that such a sleeve 330 does not necessarily have to be enclosed on all circumferential sides along the entire lateral length of sleeve 330 (or even at any location along the length of sleeve 330). For instance, exemplary sleeve 330 as shown, e.g., in FIGS. 6 and 7 is forwardly open along its entire length rather than being fully enclosed along any portion of its length; nevertheless it defines an interior space 331 in a manner adequate for the purposes discussed below.

As shown in FIG. 15, a connector 400 can be connected to dorsal plate 300 by way of sleeve 330. The term connector is used in general to signify any entity that can be connected to dorsal plate 300 and to which a safety line or safety device can be connected in ordinary use of the harness. In some embodiments a connector 400 may be a carabiner. In some embodiments a connector 400 may take the general form illustrated in FIG. 15. Such a connector may comprise a main body with an elongate closure pin 401 that is slidably movable relative to the main body, and with one or more actuators (e.g., spring-biased buttons) that can be actuated to allow the closure pin to be slidably moved. Elongate closure pin 401 of connector 400 can be passed through interior space 331 of sleeve 330 and locked to the main body of connector 400. Such connectors (sometimes referred to as single-pin connectors), other connectors, and other potentially useful feature of dorsal braces, dorsal plates, and harnesses in general, are discussed and depicted in further detail in U.S. Provisional Patent Application No. 62/793,163, which is incorporated by reference in its entirety herein.

In other embodiments, a connector may take the general form illustrated in FIG. 17. For example, it may be a twin-pin connector 410 of the general type described in U.S. Provisional Patent Application No. 62/532,005 and in the resulting International (PCT) Patent Application Publication No. WO2019/012468, both of which are incorporated by reference in their entirety herein. Some such connectors, in particular certain twin-pin connectors, may allow multiple safety devices to be attached thereto. In particular embodiments, two so-called personal self-retracting lifelines (such as, e.g., Twin-Leg Nano-Lok personal self-retracting lifelines available from 3M Fall Protection) may be connected to a twin-pin connector of the general type shown in FIG. 17, e.g., in order to achieve a 100% tie-off configuration. Other features and attributes of safety harnesses and components and uses thereof are discussed in U.S. patent Ser. No. 10/137,322 and 10232199, both of which are incorporated by reference in their entirety herein.

Inspection of, e.g., FIGS. 4 and 13 reveals an advantageous property of positioning an integral sleeve 330 directly above a through-opening 310 into which fastener 150 of brace 100 is fastened. Specifically, a lower portion of sleeve 330 can serve as the previously-described upper lintel 315 that defines the upper edge of through-opening 310. With fastener 150 in place, the upper surfaces 158 and 160 (as visible in FIG. 8) of shelves 157 and 159 of fastener 150 will closely abut (i.e., will be no more than 2.0 mm away from at a point of closest approach) a lower surface 316 (visible in FIGS. 12 and 13) of upper lintel 315. That is, the upper surfaces of shelves 157 and 159 will be positioned very close to the lower surface of sleeve 330. An arrangement of this general type is visible in FIG. 7. In various embodiments these items may be abutted to within 1.5, 1.0, or 0.5 mm; or, they may be in actual contact with each other.

Such an arrangement can provide that when a force is applied to sleeve 330 (e.g., as the result of the weight of one or more personal self-retracting lifelines that are connected to a connector 400 that is mounted on sleeve 330), a significant amount of this force may be transmitted into the closely-abutting components of fastener 150. Such an arrangement can allow a significant portion of the load from an item connected to sleeve 330 to be transmitted from sleeve 330 directly into brace 100 and from there downward to waist strap 5, without the load having to pass through shoulder straps 2 and 3. This can be contrasted to arrangements in which a significant portion of such a load is instead transmitted to shoulder straps 2 and 3. The present arrangements thus allow for maximally efficient transmission of force directly into and along the dorsal brace, which can enhance the comfort of the user by relieving the load on the user's shoulders.

FIGS. 16 and 17 illustrate different styles of sleeves 330 than that depicted in FIGS. 13 and 15. That is, rather than comprising a sleeve that is integrally molded as part of dorsal plate 300, FIGS. 16 and 17 depict sleeves 330 that are separately made and moreover are offset (spaced away) from dorsal plate 300. For example, such a sleeve 330 may be provided at the ends of support arms 337 that serve to space sleeve 330 away from (e.g., generally rearward of) dorsal plate 300, as in the exemplary arrangement depicted in FIG. 16. Such a sleeve may be made of, e.g., molded organic polymeric material, or metal, or any suitable material. Regardless of the material of construction, such a sleeve will comprise an elongate interior space 331 through which an elongate member (e.g., a pin) of a connector can pass. In some embodiments, the support arms 337 of such a sleeve may be mounted on the same shaft 41 that is used by D-ring 40, so that D-ring 40 and sleeve 330 have a common axis of rotation, as in the exemplary designs of FIGS. 16 and 17.

In embodiments in which one or more sleeves 330, of any type, are present, and are fitted with any type of connector, ordinary artisans will readily understand how, in such designs, shoulder straps 2 and 3 can extend through the various gaps and slots that are present. For example, in the exemplary embodiment of FIG. 15, straps 2 and 3 may extend through gap 402 defined by connector 400 (as well as extending through the previously-described through-opening 310 of dorsal plate 330).

It will be appreciated that many variations of the above arrangements are possible. In particular, the number and geometric arrangement of tabs, struts, shelves, and/or spars may be varied as desired. It will be appreciated that, for example, a self-locking fastener as disclosed herein may comprise at least one generally forward-extending shelf, at least one tab that extends generally upward from the shelf, and at least one locking hook that is positioned below the shelf and is spaced apart from the shelf. These items and any components that support them can be configured so that one or more of these items can momentarily deflect to the extent needed to allow the items to self-lock to a complementary through-aperture of a dorsal plate. Thus a wide variety of arrangements, in particular different numbers, shapes, sizes, angles of orientation, and so on, of items such as spars, struts, shelves, and so on, are possible. In particular, there may not necessarily be any firm dividing line between items labeled herein as a "shelf" and those labeled herein as a "strut". That is, a strut may be designed so that a portion of the strut provides a shelf. Furthermore, in some embodiments one or more tabs and one or more locking hooks may be spaced apart along a generally lateral direction rather than along a generally vertical direction; or a combination of both approaches may be used. Still further, parameters such as, e.g., the perimeter shape, and/or size, of a dorsal plate may be varied; for example, the exemplary dorsal plates 300 depicted in FIGS. 1 and 2 differ in perimeter shape from those of the other Figures.

It is emphasized that a user of any fall-protection device, apparatus, system, or component thereof described herein is tasked with carrying out any appropriate steps, actions, precautions, operating procedures, etc., as required by applicable laws, rules, codes, standards, and/or instructions. That is, under no circumstances will the presence of any arrangement disclosed herein relieve a user of the duty to follow all appropriate laws; rules; codes; standards as promulgated by applicable bodies (e.g., ANSI); instructions as provided by the manufacturer of the fall-protection system, apparatus or components; instructions as provided by the entity in charge of a worksite, and so on.

It will be apparent to those skilled in the art that the specific exemplary embodiments, elements, structures, features, details, arrangements, configurations, etc., that are disclosed herein can be modified and/or combined in numerous ways. It is emphasized that any embodiment disclosed herein may be used in combination with any other embodiment or embodiments disclosed herein, as long as the embodiments are compatible. For example, any herein-described feature or arrangement of a dorsal brace may be used in combination with any herein-described feature or arrangement of a dorsal plate, as long as such features and arrangements are compatible. Similarly, the methods disclosed herein may be used with a dorsal brace and a dorsal plate comprising any of the features or arrangements disclosed herein. By way of a specific example, any of the geometric features of an item (e.g., a fastener) that are disclosed herein may be used in combination with any of the herein-disclosed compositional and/or physical-property features (e.g., flexural modulus) of the material of which the item is made. While no other specific examples will be listed here, it is emphasized that all such combinations are envisioned and are only prohibited in the specific instance of a combination that is incompatible.

In summary, all such variations and combinations are contemplated as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document that is incorporated by reference herein but to which no priority is claimed, this specification as written will control.

What is claimed is:

1. A fall-protection safety harness, comprising:

left and right shoulder straps that overlap and cross at a dorsal crossing point;

a dorsal plate mounted on the left and right shoulder straps at the dorsal crossing point;

a waist strap;

and, a dorsal brace comprising a self-locking fastener at the upper end of the dorsal brace, the self-locking fastener being self-locked to the dorsal plate and a lower end of the dorsal brace being connected to the waist strap;

wherein the self-locking fastener at the upper end of the dorsal brace comprises:

an elongate beam that extends in a generally lateral direction from an upper end of an elongate, generally vertical member of the dorsal brace;

at least one spar that extends generally upward from the elongate beam;

at least one strut that extends in a generally lateral direction from an upper end of the at least one spar;

at least one shelf that extends generally forward from at least a portion of the at least one strut;

and, at least one tab that extends generally upward from at least a portion of the at least one shelf;

and wherein the self-locking fastener at the upper end of the dorsal brace further comprises a forwardly-protruding locking hook that comprises a flange that extends generally forward from a forward edge of the elongate beam and that comprises a locking lip that extends generally downward from a forward edge of the flange.

2. The safety harness of claim 1 wherein the elongate beam, the at least one spar, and the at least one strut, at least partially define a forward-rearward through-opening that is configured to allow the left and right shoulder straps of the safety harness to extend therethrough when the safety harness is worn by a human user.

3. The safety harness of claim 1 wherein the at least one spar, at least one strut, at least one shelf, and at least one tab of the self-locking fastener at the upper end of the dorsal brace comprise:

a left spar that extends generally upward from a left end of the elongate beam;

a left strut that extends in a generally laterally-inward direction from an upper end of the left spar;

a left shelf that extends generally forward from at least a portion of the left strut;

and, a left tab that extends generally upward from at least a portion of the left shelf;

and, a right spar that extends generally upward from a right end of the elongate beam;

a right strut that extends in a generally laterally-inward direction from an upper end of the right spar;

a right shelf that extends generally forward from at least a portion of the at right strut;

and, a right tab that extends generally upward from at least a portion of the right shelf.

4. The safety harness of claim 3 wherein laterally-inward-most terminal ends of the left and right struts, the left and right shelves, and the left and right tabs, define a generally vertically oriented slot that is configured to allow the left and right shoulder straps of the safety harness to be passed therethrough during a process of installing the dorsal brace on the safety harness.

5. The safety harness of claim 1 wherein a forwardmost surface of the locking hook is coplanar with, or is rearwardly recessed from 0.1 mm to 1.0 mm relative to, a forward surface of the at least one tab.

6. A fall-protection safety harness, comprising:

left and right shoulder straps that overlap and cross at a dorsal crossing point;

a dorsal plate mounted on the left and right shoulder straps at the dorsal crossing point;

a waist strap;

and, a dorsal brace comprising a self-locking fastener at an upper end of the dorsal brace, the self-locking fastener being self-locked to the dorsal plate and a lower end of the dorsal brace being connected to the waist strap;

wherein the dorsal plate comprises a forward-rearward through-opening that is shaped and sized to receive portions of the self-locking fastener of the dorsal brace thereinto so that the self-locking fastener is fastened, and self-locked, to the dorsal plate, wherein the through-opening of the dorsal plate comprises an upper, laterally-extending lintel and a lower, laterally-extending sill, with the lintel and the sill respectively defining upper and lower edges of the through-opening.

7. The safety harness of claim 6 wherein a portion of the lower, laterally-extending sill is interrupted by a laterally-extending notch in which a locking flange defines a lower edge of the notch, wherein the notch is configured to receive a forwardly-protruding locking hook of the self-locking fastener of the dorsal brace so that when the self-locking fastener is fastened to the dorsal plate, a downwardly-extending locking lip of the locking hook forwardly abuts the locking flange of the dorsal plate thus self-locking the fastener to the dorsal plate.

8. The safety harness of claim 6 wherein the self-locking fastener of the dorsal brace and the upper lintel of the dorsal plate are configured so that when the self-locking fastener is fastened, and self-locked, to the dorsal plate, a rear surface of an upwardly-extending tab of the fastener forwardly abuts a forward surface of the upper lintel of the dorsal plate.

9. The safety harness of claim 8 wherein the forward surface of the upper lintel of the dorsal plate is recessed rearwardly relative to a major forward surface of a main body of the dorsal plate, a distance that is within plus or minus 20% of a thickness of the upwardly-extending tab of the self-locking fastener, so that when the dorsal brace is fastened to the dorsal plate, a forward surface of the upwardly-extending tab of the fastener is at least generally coplanar with the major forward surface of the main body of the dorsal plate.

10. The safety harness of claim 6 wherein when the self-locking fastener of the dorsal brace is fastened to the dorsal plate, the forward-rearward through-opening of the dorsal plate is at least partially aligned, along a forward-rearward direction, with a forward-rearward through-opening defined by an elongate beam, at least one spar, and at least one strut, of the fastener, so that the left and right shoulder straps of the safety harness extend through the aligned portions of the through-openings of the dorsal plate and the fastener when the safety harness is worn by a human user.

11. The safety harness of claim 6 wherein the harness comprises a dorsal D-ring that is pivotally connected to the dorsal plate and wherein the harness further comprises a sleeve configured to receive an elongate member of a connector.

12. The safety harness of claim 11 wherein the sleeve is an integral portion of a main body of the dorsal plate, wherein the sleeve comprises a lower outer surface, and wherein the self-locking fastener of the dorsal brace, and the sleeve of the dorsal plate, are configured so that when the fastener is fastened to the dorsal plate, an upper surface of at least one shelf of the fastener is positioned underneath the lower outer surface of the sleeve of the dorsal plate and closely abuts, within 2.0 mm, the lower outer surface of the sleeve of the dorsal plate.

13. The safety harness of claim 11 wherein a lower portion of the sleeve serves as an upper, laterally-extending lintel that defines an upper and lower edges of the forward-rearward through-opening of the dorsal plate.

14. The safety harness of claim 6 wherein the dorsal plate comprises:

a rigid main body comprised of molded organic polymeric material and exhibiting a flexural modulus of from 1.0 GPa to 10.0 GPa;

a flexible upper extension that is overmolded onto, and extends upwardly from, an upper portion of the rigid main body, and is comprised of an organic polymeric material with a flexural modulus of less than 1.0 GPa; and, a flexible lower extension that is overmolded onto, and extends upwardly from, a lower portion of the rigid main body, and is comprised of an organic polymeric material with a flexural modulus of less than 1.0 GPa; and, wherein portions of the rigid main body of the dorsal plate circumscribe all four sides of the forward-rearward through-opening of the dorsal plate.

15. The safety harness of claim 14 wherein a locking flange that defines a lower edge of a notch provided in a laterally-extending sill that defines a lower edge of the through-opening, is provided by an exposed portion of the rigid main body, which exposed portion protrudes upward beyond a portion of the flexible lower extension that neighbors the exposed portion of the rigid main body.

16. The safety harness of claim 6 wherein the lower end of the dorsal brace is removably connected to the waist strap by way of being connected to a rear waist-strap plate that is mounted on the waist strap.

17. A method of equipping the fall-protection safety harness of claim 6 with the dorsal brace, the method comprising:

manually pressing the self-locking fastener of the upper end of the dorsal brace forwardly against the dorsal plate of the safety harness so that the integral fastener fastens, and self-locks, to the dorsal plate thus causing the upper end of the dorsal brace to be connected to the harness;

and, manually connecting a lower end of the dorsal brace to a rear waist-strap plate that is mounted on a waist strap of the harness so that the lower end of the dorsal brace is disconnectably and pivotally connected to the rear waist-strap plate.

18. The method of claim 17 wherein the method is a field-installation by a user of the harness.

19. A dorsal brace configured to be installed on a fall-protection safety harness, the brace comprising:

an elongate member and a self-locking fastener that extends integrally from an upper end of the elongate member, wherein the self-locking fastener comprises a shelf that extends generally forward and a tab that extends generally upward from a forward edge of at least a portion of the shelf;

wherein the self-locking fastener further comprises a locking hook that is positioned below the shelf and is spaced apart from the shelf, the locking hook comprising a flange that extends generally forward and a locking lip that extends generally downward from at least a portion of a forward edge of the flange.

20. The dorsal brace of claim 19 wherein a lower major surface of the shelf is planar, wherein an upper surface of the flange of the locking hook is planar, and wherein the lower major surface of the shelf is generally parallel to the upper surface of the flange of the locking hook.

21. The dorsal brace of claim 19 wherein an elongate, generally vertical member of the dorsal brace and the self-locking fastener at the upper end of the dorsal brace are portions of a single, integral, molded body that consists essentially of an organic polymeric material exhibiting a flexural modulus of at least 1.0 GPa, to 10.0 GPa and that does not include any elongate metal reinforcing strut or beam.

* * * * *